United States Patent
Bando

(10) Patent No.: US 7,555,587 B2
(45) Date of Patent: Jun. 30, 2009

(54) COMMUNICATION APPARATUS, ELECTRONIC APPLIANCE AND COMMUNICATION SYSTEM INCLUDING A COMMUNICATION APPARATUS IN COMMUNICATION WITH AN ELECTRONIC APPLIANCE FOR DATA COMMUNICATIONS

(75) Inventor: Hideaki Bando, Tokyo (JP)

(73) Assignee: Sony Corporation, Tokyo (JP)

( * ) Notice: Subject to any disclaimer, the term of this patent is extended or adjusted under 35 U.S.C. 154(b) by 730 days.

(21) Appl. No.: 11/190,716

(22) Filed: Jul. 26, 2005

(65) Prior Publication Data
US 2006/0023115 A1 Feb. 2, 2006

(30) Foreign Application Priority Data
Jul. 30, 2004 (JP) ............ P2004-224042

(51) Int. Cl.
G06F 13/00 (2006.01)
(52) U.S. Cl. ............ 710/301; 710/315; 710/307
(58) Field of Classification Search ......... 710/300–315; 235/441, 451, 380, 436, 492
See application file for complete search history.

(56) References Cited

U.S. PATENT DOCUMENTS 7,159,064 B2 * 1/2007 Gillet .................. 710/307
7,325,746 B2 * 2/2008 Nishizawa et al. ........ 235/492
7,360,713 B2 * 4/2008 Nishizawa et al. ........ 235/492

FOREIGN PATENT DOCUMENTS

JP 2003242470 8/2003

* cited by examiner

Primary Examiner—Raymond N Phan
(74) Attorney, Agent, or Firm—K&L Gates LLP

(57) ABSTRACT

A communication system, a communication apparatus, and an electronic appliance are provide. The communication system, a communication apparatus and an electronic appliance can operate at a high data transfer rate without raising the frequency of the data transfer clock. In a communication apparatus, which is a card-shaped semiconductor memory apparatus, eleventh, twelfth, thirteenth and fourteenth belt-like terminals T (T11, T12, T13 and T14) are provided in addition to the third, fourth, fifth and seventh belt-like terminals T (T3, T4, T5 and T7) arranged at an end of the cabinet as terminals for transmitting data to and receiving data from a digital still camera. With this arrangement, the number of terminals that can be used for exchanging data with the digital still camera is increased from four to eight to make it possible to improve the data transfer rate without raising the frequency of the data transfer clock.

7 Claims, 17 Drawing Sheets

COMMUNICATION APPARATUS, ELECTRONIC APPLIANCE AND COMMUNICATION SYSTEM INCLUDING A COMMUNICATION APPARATUS IN COMMUNICATION WITH AN ELECTRONIC APPLIANCE FOR DATA COMMUNICATIONS

CROSS REFERENCE TO RELATED APPLICATIONS

The present application claims priority to Japanese Patent Application JP2004-224042 filed in the Japanese Patent Office on Jul. 30, 2005, the entire contents of which being incorporated herein by reference.

BACKGROUND

The present invention relates to a communication system, a communication apparatus and an electronic appliance. The present invention can suitably be applied to a semiconductor memory apparatus adapted to receive data transmitted from an electronic appliance when it is fitted to the electronic appliance, which may typically be a digital still camera, and store them in the internal semiconductor memory.

Among semiconductor memory apparatus of the above-described type, card-shaped semiconductor memory apparatus showing a card-like profile have become popular in recent years. For example, memory stick PRO (R) is known as card-shaped semiconductor memory apparatus (see Japanese Patent Application Laid-Open Publication No. 2003-242470).

Such a card-shaped semiconductor memory apparatus is typically mounted in a digital still camera for use. As the digital still camera is operated by the user to pick up an image of an object of shooting, it executes a necessary image pickup process and transmits the video data obtained as a result of the image pickup process to the card-shaped semiconductor memory apparatus mounted in it. Then, the card-shaped semiconductor memory apparatus receives the video data transmitted from the digital still camera and stores them in the semiconductor memory in the inside.

Now, the typical configuration of card-shaped semiconductor memory apparatus will be described by referring to FIGS. 1A through 5 of the accompanying drawings. As shown in FIG. 1A, card-shaped semiconductor memory apparatus 1X has a substantially box-shaped cabinet 2X.

A plurality of belt-like terminals T (T1X through T10X) to be connected to an electronic appliance such as a digital still camera when communicating with the electronic appliance are arranged along one of the short edges of the rear surface of the cabinet 2X as shown in FIG. 1A. The belt-like terminals T are arranged in such a way that their longitudinal directions agree with the longitudinal direction of the cabinet 2X so as to be separated from each other by gaps and run in parallel with each other.

The lowermost belt-like terminal, or the first belt-like terminal T1X, of the belt-like terminals T (T1X through T10X) is connected to the ground potential level when it is connected to the electronic appliance. The second belt-like terminal T2X arranged immediately above the first belt-like terminal T1X is adapted to receive a bus state signal (which will be described in greater detail hereinafter) from the electronic appliance. The third through fifth belt-like terminals T (T3X through T5X) arranged sequentially above the second belt-like terminal T2X are adapted to receive data as input from and output data to the electronic appliance for data transmission/reception. The sixth belt-like terminal T6X arranged immediately above the fifth belt-like terminal T5X is adapted to be used when judging if the card-shaped semiconductor memory apparatus 1X is properly mounted in the electronic appliance or not.

The seventh belt-like terminal T7X arranged immediately above the sixth belt-like terminal T6X is adapted to receive data as input from and output data to the electronic appliance for data transmission/reception. The eighth belt-like terminal T8X arranged immediately above the seventh belt-like terminal T7X is adapted to receive clock signals necessary for data communication with the electronic appliance. The ninth belt-like terminal T9X immediately above the eighth belt-like terminal T8X is adapted to be used when power is supplied from the electronic appliance. The tenth belt-like terminal T10X arranged above the ninth belt-like terminal T9X is connected to the ground potential level when it is connected to the electronic appliance.

Now, referring to FIG. 2, a digital still camera in which the card-shaped semiconductor memory apparatus 1X is mounted is provided with a card insertion slot 100 through which the card-shaped semiconductor memory apparatus 1X is inserted. A plurality of terminal connecting sections 101 are arranged in the card insertion slot 100 so as to correspond to the belt-like terminals T of the card-shaped semiconductor memory apparatus 1X when the latter is inserted in the card insertion slot 100.

The card-shaped semiconductor memory apparatus 1X is inserted into the card insertion slot 100 along the longitudinal direction of the cabinet 2X using the short side thereof as leading edge. Then, as a result, the plurality of terminal connecting sections 101 arranged in the card insertion slot 100 and the corresponding belt-like terminals T of the card-shaped semiconductor memory apparatus 1X are connected to each other respectively. In this way, the card-shaped semiconductor memory apparatus 1X is mounted in the digital still camera.

As a result, the control section of the digital still camera can sequentially input the video data acquired typically by way of an image pickup process to the card-shaped semiconductor memory apparatus 1X by way of the terminal connecting sections 101 in the card insertion slot 100 and then the belt-like terminals T connected to them. At this time, the control section of the card-shaped semiconductor memory apparatus 1X causes the internal semiconductor memory to store the video data input from the digital still camera by way of the belt-like terminals T.

Now, the connection arrangement for the digital still camera and the card-shaped semiconductor memory apparatus 1X will be described in greater detail by referring to FIGS. 3 and 4 of the accompanying drawings. As shown in FIGS. 3 and 4, the digital still camera and the card-shaped semiconductor memory apparatus 1X are connected to each other by way of first through tenth connection lines L (L1 through L10).

The first connection line L1 is established when the fourth belt-like terminal T4X of the card-shaped semiconductor memory apparatus 1S and the corresponding one of the terminal connecting sections 101 on the digital still camera side are connected to each other. Similarly, the second, third and fourth connection lines L (L2 through L4) are established when the third, fifth and seventh belt-like terminals T (T3X, T5X and T7X) and the corresponding ones of the terminal connecting sections 101 on the digital still camera side are connected to each other respectively. Likewise, the fifth, sixth and seventh connection lines L (L5 through L7) are established when the second, eighth and ninth belt-like terminals T (T2X, T8X and T9X) and the corresponding ones of the terminal connecting sections 101 on the digital still camera side are connected to each other respectively. Similarly, the eighth, ninth and tenth connection lines L (L8 through L10) are established when the first, tenth and sixth belt-like terminals T (T1X, T10X, T6X) and the corresponding ones of the terminal connecting sections 101 on the digital still camera side are connected to each other respectively.

More specifically, the card-shaped semiconductor memory apparatus 1X has an interface section 200 connected to the connection lines L (L1 through L10) and conducts data communications with the digital still camera by way of the interface section 200 and then the connection lines L of the interface section 200. Similarly, the digital still camera has an interface section 300 to be connected to the connection lines L and conducts data communications with the card-shaped semiconductor memory apparatus 1X by way of the interface section 300 and then the connection lines L.

Now, the configuration of the interface section 300 of the digital still camera will be described below. A first input buffer IB1 and a first output buffer OB1 are arranged in the interface section 300 so as to be connected to the first connection line L1. The first input buffer IB1 inputs the data that is input to it from the card-shaped semiconductor memory apparatus 1X by way of the first connection line L1 to a first flip-flop circuit F1 that is arranged immediately downstream relative to it. The first flip-flop circuit F1 takes in data from the card-shaped semiconductor memory apparatus 1X by latching the data from the first input buffer IB1 at the falling edge of the clock signal supplied from clock generator 301 that is arranged in the digital still camera. On the other hand, the first output buffer OB1 is connected to a second flip-flop circuit F2. The data to be transmitted to the card-shaped semiconductor memory apparatus 1X is input to the second flip-flop circuit F2 from a predetermined circuit that is arranged immediately upstream relative to it. The second flip-flop circuit F2 latches the data input from the predetermined circuit arranged immediately upstream to it at the falling edge of the clock signal supplied from the clock generator 301 and transmits it to the card-shaped semiconductor memory apparatus 1X by way of the first output buffer OB1 and then the first connection line L1. Meanwhile, the first output buffer OB1 is designed to be switched from a data output ready state where data can be output from the second flip-flop circuit F2 to the card-shaped semiconductor memory apparatus 1X to a data output suspended state where any output of data is suspended by a high impedance or vice versa according to the first switching control signal S1 supplied from a predetermined circuit in the digital still camera.

Additionally, a second input buffer IB2 and a second output buffer OB2 are arranged in the interface section 300 so as to be connected to the second connection line L2. The second input buffer IB2 is connected to a third flip-flop circuit F3 that operates like the above described first flip-flop circuit F1. The second output buffer OB2 is connected to a fourth flip-flop circuit F4 that operates like the above described second flip-flop circuit F2. Meanwhile, the second output buffer OB2 is designed to be switched from a data output ready state to a data output suspended state or vice versa according to not the first switching control signal S1 but the second switching control signal S2 supplied from the predetermined circuit in the digital still camera.

Additionally, a third input buffer IB3 and a third output buffer OB3 are arranged in the interface section 300 so as to be connected to the third connection line L3. The third input buffer IB3 is connected to a fifth flip-flop circuit F5 that operates like the above described first flip-flop circuit F1. The third output buffer OB3 is connected to a sixth flip-flop circuit F6 that operates like the above described second flip-flop circuit F2. Meanwhile, the third output buffer OB3 is designed to be switched from a data output ready state to a data output suspended state or vice versa according to the second switching control signal S2 supplied from the predetermined circuit in the digital still camera.

Additionally, a fourth input buffer IB4 and a fourth output buffer OB4 are arranged in the interface section 300 so as to be connected to the fourth connection line L4. The fourth input buffer IB4 is connected to a seventh flip-flop circuit F7 that operates like the above described first flip-flop circuit F1. The fourth output buffer OB4 is connected to an eighth flip-flop circuit F8 that operates like the above described second flip-flop circuit F2. Meanwhile, the fourth output buffer OB4 is designed to be switched from a data output ready state to a data output suspended state or vice versa according to the second switching control signal S2 supplied from the predetermined circuit in the digital still camera.

Still additionally, a fifth output buffer OB5 is connected to the fifth connection line L5 in the interface section 300 and also to a ninth flip-flop circuit F9. The ninth flip-flop circuit F9 latches the bus state signal (which will be described in greater detail hereinafter) from the predetermined circuit arranged immediately upstream to it at the falling edge of the clock signal supplied from the clock generator 301 and transmits it to the card-shaped semiconductor memory apparatus 1X by way of the fifth output buffer OB5 and then the fifth connection line L5.

Furthermore, in the interface section 300, the clock signal generated by the clock generator 301 is input to the card-shaped semiconductor memory apparatus 1X by way of a sixth output buffer OB6 and then the sixth connection line L6.

Now, the configuration of the interface section 200 of the card-shaped semiconductor memory apparatus 1X will be described below. A 21st input buffer IB21 and a 21st output buffer OB21 are arranged in the interface section 200 so as to be connected to the first connection line L1. The 21st input buffer IB21 inputs the data that is input to it from the digital still camera by way of the first connection line L1 to the 21st and 22nd flip-flop circuits F (F21 and F22) that are arranged immediately downstream relative to it. The 21st flip-flop circuit F21 is adapted to be utilized in a serial transfer mode, which will be described in greater detail hereinafter, and the 22nd flip-flop circuit F22 is adapted to be utilized in a parallel transfer mode, which will also be described in greater detail hereinafter. The 21st flip-flop circuit F21 takes in data from the digital still camera by latching the data from the 21st input buffer IB21 at the rising edge of the clock signal supplied from the clock generator 301 that is arranged in the digital still camera by way of the sixth connection line L6 and then a 26-th input buffer IB26. The 22nd flip-flop circuit F22 also takes in data from the digital still camera by latching the data from the 21st input buffer IB21 at the falling edge of the clock signal supplied from the clock generator 301 that is arranged in the digital still camera by way of the sixth connection line L6 and then the 26th input buffer IB26. On the other hand, the 21st output buffer OB21 is connected to a 23rd flip-flop circuit F23. The data to be transmitted to the digital still camera is input to the 23rd flip-flop circuit F23 from the circuit arranged immediately upstream relative to it. The 23rd flip-flop circuit F23 latches the data input from the immediately upstream circuit and transmits it to the digital still camera by way of the 21st output buffer OB21 and then the first connection line L1 at the falling edge of the clock signal supplied from the clock generator 301 of the digital still camera by way of the sixth connection line L6. Meanwhile, the 21st output buffer OB21 is designed to be switched from a data output ready state where data can be output from the 23rd flip-flop circuit F23 to the digital still camera to a data output suspended state where any output of data is suspended by a high impedance or vice versa according to the third switching control signal S3 supplied from a predetermined circuit in the card-shaped semiconductor memory apparatus 1X.

Additionally, a 22nd input buffer IB22 and a 22nd output buffer OB22 are arranged in the interface section 200 so as to be connected to the second connection line L2. The 22nd input buffer IB22 is connected to a 24th flip-flop circuit F24 that operates like the above described 22nd flip-flop circuit 22. The 22nd output buffer OB22 is connected to a 25th flip-flop circuit F25 that operates like the above-described 23rd flip-flop circuit F23. Meanwhile, the 22nd output buffer OB22 is designed to be switched from a data output ready state to a data output suspended state or vice versa according to not the third switching control signal S3 but the fourth switching control signal S4 supplied from the predetermined circuit in the card-shaped semiconductor memory apparatus 1X.

Additionally, a 23rd input buffer IB23 and a 23rd output buffer OB23 are arranged in the interface section 200 so as to be connected to the third connection line L3. The 23rd input buffer IB23 is connected to a 26th flip-flop circuit F26 that operates like the above described 22nd flip-flop circuit 22. The 23rd output buffer OB23 is connected to a 27th flip-flop circuit F27 that operates like the above described 23rd flip-flop circuit F23. Meanwhile, the 23rd output buffer OB23 is designed to be switched from a data output ready state to a data output suspended state or vice versa according to the fourth switching control signal S4 supplied from the predetermined circuit in the digital still camera.

Additionally, a 24th input buffer IB24 and a 24th output buffer OB24 are arranged in the interface section 200 so as to be connected to the fourth connection line L4. The 24th input buffer IB24 is connected to a 28th flip-flop circuit F28 that operates like the above described 22nd flip-flop circuit 22. The 24th output buffer OB24 is connected to a 29th flip-flop circuit F29 that operates like the above described 23rd flip-flop circuit F23. Meanwhile, the 24th output buffer OB24 is designed to be switched from a data output ready state to a data output suspended state or vice versa according to the fourth switching control signal S4 supplied from the predetermined circuit in the digital still camera.

Additionally, a 25th input buffer IB25 is arranged in the interface section 200 so as to be connected to the fifth connection line L5. The 25th input buffer IB25 inputs the data that is input to it from the digital still camera by way of the fifth connection line L5 to the 30th and 31st flip-flop circuits F (F30 and F31) that are arranged immediately downstream relative to it. The 30th flip-flop circuit F30 is adapted to be utilized in a serial transfer mode, which will be described in greater detail hereinafter, and the 31st flip-flop circuit F31 is adapted to be utilized in a parallel transfer mode, which will also be described in greater detail hereinafter. The 30th flip-flop circuit F30 is adapted to latch a bus state signal from the 25th input buffer IB25 at the rising edge of the clock signal supplied from the clock generator 301 in the digital still camera by way of the sixth connection line L6 and then the 26th input buffer IB26. The 31st flip-flop circuit F31 is adapted to latch a bus state signal from the 25th input buffer IB25 at the falling edge of the clock signal supplied from the clock generator 301 in the digital still camera by way of the sixth connection line L6 and then the 26th input buffer IB26.

Power is supplied from the digital still camera to the card-shaped semiconductor memory apparatus 1X by way of the seventh connection line L7. The voltage range of the power supply is typically between 2.7 and 3.6 V. The grounding terminal of the digital still camera and that of the card-shaped semiconductor memory apparatus 1X are connected to each other by way of the eighth and ninth connection lines L (L8 and L9). As a result, the ground level of the digital still camera agrees with that of the card-shaped semiconductor memory apparatus 1X.

An insertion/pulled out detection process is conducted to detect if the digital still camera and the card-shaped semiconductor memory apparatus 1X are connected properly or not by way of the tenth connection line L10. More specifically, line L50 that is to be connected to an end of the tenth connection line L10 is connected to a predetermined electric potential (pulled up) by way of a resistor in the interface section 300 of the digital still camera. As the card-shaped semiconductor memory apparatus 1X is connected properly to the digital still camera, the other end of the tenth connection line L10 is connected to the grounding terminal of the card-shaped semiconductor memory apparatus 1X. Thus, the electric potential of the line L50 of the interface section 300 of the digital still camera is brought to level Low at this time. Therefore, the digital still camera decides that the card-shaped semiconductor memory apparatus 1X is not connected to it if the electric potential of the line L50 is at level Hi, whereas it decides that the card-shaped semiconductor memory apparatus 1X is properly connected to it if the electric potential of the line L50 is at level Low.

Meanwhile, two modes are provided for data communications between the digital still camera and the card-shaped semiconductor memory apparatus 1X. One of the two modes is a serial transfer mode for transferring 1-bit data by utilizing only the first connection line L1. The other of the two modes is a 4-bit parallel transfer mode for transferring 4-bit data by utilizing the first through fourth connection lines L (L1 through L4).

Now, the data communication process in a serial transfer mode will be described below. When data are transmitted from the digital still camera to the card-shaped semiconductor memory apparatus 1X in a serial transfer mode, the first output buffer OB1 of the digital still camera is brought into a data output ready state by a first switching control signal S1 supplied from a predetermined circuit in the digital still camera to the first output buffer OB1 and, at the same time, the second through fourth output buffers OB (OB2 through OB4) are brought into a data output suspended state by a second switching control signal S2 supplied from the predetermined circuit to the second through fourth output buffers OB (OB2 through OB4).

At this time, in the card-shaped semiconductor memory apparatus 1X, the 21st output buffer OB21 is brought into a data output suspended state by a third switching control signal S3 supplied from a predetermined circuit in the card-shaped semiconductor memory apparatus 1X to the 21st output buffer OB21 and, at the same time, the 22nd through 24th output buffers OB (OB22 through OB24) are also brought into a data output suspended state by a fourth switching control signal S4 supplied from the predetermined circuit to the 22nd through 24th output buffers OB (OB22 through OB24).

As a result, in the digital still camera, the data output from the second flip-flop circuit F2 so as to be transmitted to the card-shaped semiconductor memory apparatus 1X is actually input to the card-shaped semiconductor memory apparatus 1X by way of the first output buffer OB1 and then the first connection line L1. At this time, in the card-shaped semiconductor memory apparatus 1X, the data input to it from the digital still camera by way of the first connection line L1 is taken in by the 21st flip-flop circuit F21 by way of the 21st input buffer IB21.

When, on the other hand, data are transmitted from the card-shaped semiconductor memory apparatus 1X to the digital still camera in a serial transfer mode, the first output buffer OB1 is brought into a data output suspended state in the digital still camera by the first switching control signal S1 supplied from a predetermined circuit of the digital still camera to the first output buffer OB1 and at the same time, the second through fourth output buffers OB (OB2 through OB4) are also brought into a data output suspended state by the second switching control signal S2 supplied from the predetermined circuit to the second through fourth output buffers OB (OB2 through OB4).

At this time, in the card-shaped semiconductor memory apparatus 1X, the 21st output buffer OB21 is brought into a data output ready state by the third switching control signal S3 supplied from a predetermined circuit in the card-shaped semiconductor memory apparatus 1X to the 21st output buffer OB21 and, at the same time, the 22nd through 24th output buffers OB (OB22 through OB24) are brought into a data output suspended state by the fourth switching control signal S4 supplied from the predetermined circuit to the 22nd through 24th output buffers OB (OB22 through OB24).

As a result, in the card-shaped semiconductor memory apparatus 1X, the data output from the 23rd flip-flop circuit F23 so as to be transmitted to the digital still camera is input to the digital still camera by way of the 21st output buffer OB21 and then the first connection line L1. At this time, in the digital still camera, the data input from the card-shaped semiconductor memory apparatus 1X by way of the first connection line L1 is taken in by the first flip-flop circuit F1 by way of the first input buffer IB1.

A data communication is conducted between the digital still camera and the card-shaped semiconductor memory apparatus 1X in a serial transfer mode only by utilizing the first connection line L1 in a manner as described above. Note that, since the maximum frequency of the clock signals generated by the clock generator 301 is 20 MHz in this case, the maximum data transfer rate between the digital still camera and the card-shaped semiconductor memory apparatus 1X is 20 Mbps.

Now, the data communication process in a 4-bit parallel transfer mode will be described below. When data are transmitted from the digital still camera to the card-shaped semiconductor memory apparatus 1X in a 4-bit parallel transfer mode, the first output buffer OB1 and the second through fourth output buffers OB (OB2 through OB4) of the digital still camera are brought into a data output ready state respectively by a first switching control signal S1 and a second switching control signal S2 supplied from a predetermined circuit in the digital still camera to the first output buffer OB1 and to the second through fourth output buffers OB (OB2 through OB4).

At this time, in the card-shaped semiconductor memory apparatus 1X, the 21st output buffer OB21 and the 22nd through 24th output buffers OB (OB22 through OB24) are brought into a data output suspended state respectively by a third switching control signal S3 and a fourth switching control signal supplied from a predetermined circuit in the card-shaped semiconductor memory apparatus 1X to the 21st output buffer OB21 and to the 22nd through 24th output buffers OB (OB22 through OB24).

As a result, in the digital still camera, the data output respectively from the second, fourth, sixth and eighth flip-flop circuits F (F2, F4, F6 and F8) so as to be transmitted to the card-shaped semiconductor memory apparatus 1X are actually input to the card-shaped semiconductor memory apparatus 1X by way of the first, second, third and fourth output buffers OB (OB1, OB2, OB3 and OB4) and then the first, second, third and fourth connection lines L (L1, L2, L3 and L4). At this time, in the card-shaped semiconductor memory apparatus 1X, the data input to it from the digital still camera by way of the first, second, third and fourth connection lines L (L1, L2, L3 and L4) are taken in respectively by the 22nd, 24th, 26th and 28th flip-flop circuits F (F22, F24, F26 and F28) by way of the 21st, 22nd, 23rd and 24th input buffers IB (IB21, IB22, IB23 and IB24).

When, on the other hand, data are transmitted from the card-shaped semiconductor memory apparatus 1X to the digital still camera in a 4-bit parallel transfer mode, the first output buffer OB1 and the second through fourth output buffers OB (OB2 through OB4) are brought into a data output suspended state in the digital still camera respectively by the first switching control signal S1 and the second switching control signal S2 supplied from a predetermined circuit of the digital still camera to the first output buffer OB1 and the second through fourth output buffers OB (OB2 through OB4).

At this time, in the card-shaped semiconductor memory apparatus 1X, the 21st output buffer OB21 and the 22nd through 24th output buffers OB (OB22 through OB24) are brought into a data output ready state respectively by the third switching control signal S3 and the fourth switching control signal S4 supplied from a predetermined circuit in the card-shaped semiconductor memory apparatus 1X to the 21st output buffer OB21 and the 22nd through 24th output buffers OB (OB22 through OB24).

As a result, in the card-shaped semiconductor memory apparatus 1X, the data output from the 23rd, 25th, 27th and 29th flip-flop circuits F (F23, F25, F27 and F29) so as to be transmitted to the digital still camera are input to the digital still camera respectively by way of the 21st, 22nd, 23rd and 24th output buffers OB (OB21, OB22, OB23 and OB24) and then the first, second, third and fourth connection lines L (L1, L2, L3 and L4). At this time, in the digital still camera, the data input from the card-shaped semiconductor memory apparatus 1X by way of the first, second, third and fourth connection lines L (L1, L2, L3 and L4) are taken in by the first, third, fifth and seventh flip-flop circuits F (F1, F3, F5 and F7) by way of the first, second, third and fourth input buffers IB (IB1, IB2, 1I33 and IB4).

A data communication is conducted between the digital still camera and the card-shaped semiconductor memory apparatus 1X in a 4-bit parallel transfer mode by utilizing the first through fourth connection lines L (L1 through L4) in a manner as described above. Note that, since the maximum frequency of the clock signals generated by the clock generator 301 is 40 MHz in this case, the maximum data transfer rate between the digital still camera and the card-shaped semiconductor memory apparatus 1X is 160 Mbps.

FIG. 5 of the accompanying drawings is a timing chart that can be used when data are transferred from the digital still camera to the card-shaped semiconductor memory apparatus 1X. Note that this timing chart is applicable to a write operation where data transmitted from the digital still camera are written into the card-shaped semiconductor memory apparatus 1X.

The data communication between the digital still camera and the card-shaped semiconductor memory apparatus 1X is divided into four states by a bus state signal input from the digital still camera to the card-shaped semiconductor memory apparatus 1X (and the four states are referred to as "bus state BS0", "bus state BS1", "bus state BS2" and "bus state BS3" so as to correspond to the timing chart).

The bus state BS0 is an idle state where no data communication takes place between the digital still camera and the card-shaped semiconductor memory apparatus 1X. When the state moves into the succeeding bus state BS1, the third switching control signal S3 and the fourth switching control signal S4 in the card-shaped semiconductor memory apparatus 1X rise to bring the 21st output buffer OB21 and the 22nd through 24th output buffers OB (OB22 through OB24) into a data output suspended state. Additionally, since the first switching control signal S1 and the second switching control signal S2 in the digital still camera fall 1-clock thereafter, the first output buffer OB1 and the second through fourth output buffers OB (OB2 through OB4) are brought into a data output ready state.

In the bus state BS1, a predetermined command (TPC (transfer protocol command)) is transferred from the digital still camera to the card-shaped semiconductor memory apparatus 1X. The predetermined command may indicate that data are to be transferred from the digital still camera to the card-shaped semiconductor memory apparatus 1X (so as to be written in the latter) or from the card-shaped semiconductor memory apparatus 1X to the digital still camera (so as to be read from the latter).

In the instance of FIG. 5, the command indicates that data are to be transferred from the digital still camera to the card-shaped semiconductor memory apparatus 1X (so as to be written in the latter). Therefore, in the succeeding bus state BS2, data are transferred from the digital still camera to the card-shaped semiconductor memory apparatus 1X.

Subsequently, when moving into the bus state BS3, since the first switching control signal S1 and the second switching control signal S2 in the digital still camera rise 1-clock before, the first output buffer OB1 and the second through fourth output buffers OB (OB2 through OB4) are brought into a data output suspended state. Then, since the third switching control signal S3 and the fourth switching control signal S4 in the card-shaped semiconductor memory apparatus 1X fall 1-clock thereafter, the 21st output buffer OB21 and the 22nd through 24th output buffers OB (OB22 through OB24) are brought into a data output ready state.

In the bus state BS3, firstly a busy signal is transmitted from the card-shaped semiconductor memory apparatus 1X to the digital still camera. During the period of transmission of the busy signal, the card-shaped semiconductor memory apparatus 1X executes a process including an operation of adding an error correction signal to the data received from the digital still camera and other operations. When the process is completed, the card-shaped semiconductor memory apparatus 1X transmits a ready signal to the digital still camera.

FIG. 6 of the accompanying drawings is a timing chart that can be used when data are transferred from the card-shaped semiconductor memory apparatus 1X to the digital still camera. Note that this timing chart is applicable to a read operation where data are read by the digital still camera from the card-shaped semiconductor memory apparatus 1X.

In the bus state BS1, a predetermined command is issued to indicate that data are to be transferred from the card-shaped semiconductor memory apparatus 1X to the digital still camera (so as to be read from the former).

In the instance of FIG. 6, when moving from the bus state BS1 to the bus state BS2, since the first switching control signal S1 and the second switching control signal S2 in the digital still camera rise 1-clock before, the first output buffer OB1 and the second through fourth output buffers OB (OB2 through OB4) are brought into a data output suspended state.

Then, since the third switching control signal S3 and the fourth switching control signal S4 in the card-shaped semiconductor memory apparatus 1X fall 1-clock thereafter, the 21st output buffer OB21 and the 22nd through 24th output buffers OB (OB22 through OB24) are brought into a data output ready state.

In the bus state BS2, firstly a busy signal is transmitted from the card-shaped semiconductor memory apparatus 1X to the digital still camera. During the period of transmission of the busy signal, the card-shaped semiconductor memory apparatus 1X executes a preparation process for transmitting data to the digital still camera. When the preparation process is completed, the card-shaped semiconductor memory apparatus 1X transmits a ready signal to the digital still camera. As the bus state moves from the bus state BS2 to the bus state BS3 in response to the transmission of the ready signal, data are transmitted from the card-shaped semiconductor memory apparatus 1X to the digital still camera.

As described in detail, the known card-shaped semiconductor memory apparatus 1X can conduct operations of data transmission between the digital still camera at a maximum data transfer rate of 160 Mbps by utilizing a 4-bit parallel transfer mode.

However, as digital still cameras tend to use more pixels, the volume of data to be transferred from a digital still camera to a corresponding card-shaped semiconductor memory apparatus 1X tends to increase further.

As the volume of video data to be transferred increases, the time to transfer the data from the digital still camera to the card-shaped semiconductor memory apparatus 1X becomes longer. Then, as the time to transfer video data becomes longer, the time to store the video data obtained by the image shooting operation of the digital still camera completely in the card-shaped semiconductor memory apparatus 1X by turn becomes longer.

A digital still camera of the type under consideration is designed so as not to execute the next image pickup process until all the video data obtained by the current image pickup process are completely stored in the card-shaped semiconductor memory apparatus 1X. Therefore, if it takes a long time before completely storing all the video data in the card-shaped semiconductor memory apparatus 1X, the continuous image pickup performance of the digital still camera inevitably becomes low.

To avoid this problem, it is necessary to raise the data transfer rate between the digital still camera and the card-shaped semiconductor memory apparatus 1X. A conceivable technique for raising the data transfer rate may be raising the frequency of the data transfer clock (the clock signal supplied from the clock generator 301).

However, the data transfer clock has already reached to 40 MHz in the known card-shaped semiconductor memory apparatus 1X as in many other known card-shaped semiconductor memory apparatus. This means that the design of the data transmission paths of the card-shaped semiconductor memory apparatus 1X may have to be drastically revised if the frequency of the data transfer clock has to be raised further. Then, there arises problems including a high cost of the card-shaped semiconductor memory apparatus 1X.

SUMMARY

In view of the above identified circumstances, the present invention intends to provide a communication system, a communication apparatus and an electronic appliance that can operate at a high data transfer rate without raising the frequency of the data transfer clock.

According to one embodiment of the present invention, there provided is a communication system having an electronic appliance and a communication apparatus communicating with the electronic appliance for data communications, the communication apparatus having a group of data communication terminals to be connected with the electronic appliance, the group of data communication terminals having end data communication terminals arranged at an end of a cabinet of the communication apparatus and central data communication terminals arranged at a central side of the cabinet relative to the end data communication terminals in array with respective end data communication terminals.

According to another embodiment of the present invention, there is provided a communication apparatus having a group of data communication terminals to be connected with an electronic appliance for data communications, the group of data communication terminals having end data communication terminals arranged at an end of a cabinet of the communication apparatus and central data communication terminals arranged at a central side of the cabinet relative to the end data communication terminals in array with respective end data communication terminals.

According to another embodiment of the present invention, there is provided an electronic appliance for communicating with a communication apparatus for data communications by way of a group of data communication terminals including end data communication terminals arranged at an end of a cabinet of the communication apparatus and central data communication terminals arranged at a central side of the cabinet relative to the end data communication terminals in array with respective end data communication terminals, the electronic appliance having: a read section for reading out data indicating the feasibility or non-feasibility of data communications by way of both the end data communication terminals and the central data communication terminals stored in the storage section of the communication apparatus from the storage section by way of the end data communication terminals; and a communication section for communicating with the communication apparatus for data communications by way of both the end data communication terminals and the central data communication terminals upon recognizing the feasibility of data communications by way of both the end data communication terminals and the central data communication terminals on the basis of the data read out by the read section.

Thus, in a communication apparatus according to the embodiment of the invention, central data communication terminals are provided in addition to the end data communication terminals that are arranged at an end of the cabinet of the communication apparatus, the central data communication terminals being arranged at central positions relative to the end data communication terminals and in array with respective end data communication terminals. With this arrangement, it is possible to increase the number of data communication terminals without altering the positions of the end data communication terminals so that it can be connected to an electronic appliance in related art adapted to use only the end data communication terminals for data communications.

Thus, according to the invention, as central data communication terminals are provided in a communication apparatus in addition to the end data communication terminals arranged at an end of the cabinet of the communication apparatus, the central data communication terminals being arranged at central positions relative to the end data communication terminals and in array with respective end data communication terminals, it is possible to increase the number of data communication terminals without altering the positions of the end data communication terminals so that it can be connected to an electronic appliance in related art adapted to use only the end data communication terminals for data communications. Thus, as a result, it is possible to raise the data transfer rate without raising the frequency of the data transfer clock. Additionally, a communication system and a communication apparatus are compatible with electronic appliances in related art.

The nature, principle and utility of the invention will become more apparent from the following detailed description when read in conjunction with the accompanying drawings in which like parts are designated by like reference numerals or characters.

Additional features and advantages are described herein, and will be apparent from, the following Detailed Description and the figures.

DETAILED DESCRIPTION

The present invention relates to a communication system, a communication apparatus and an electronic appliance. The present invention can suitably be applied to a semiconductor memory apparatus adapted to receive data transmitted from an electronic appliance when it is fitted to the electronic appliance, which may typically be a digital still camera, and store them in the internal semiconductor memory.

Now, the present invention will be described in greater detail by referring to the accompanying drawings that illustrate preferred embodiments of the invention.

Figure 7:
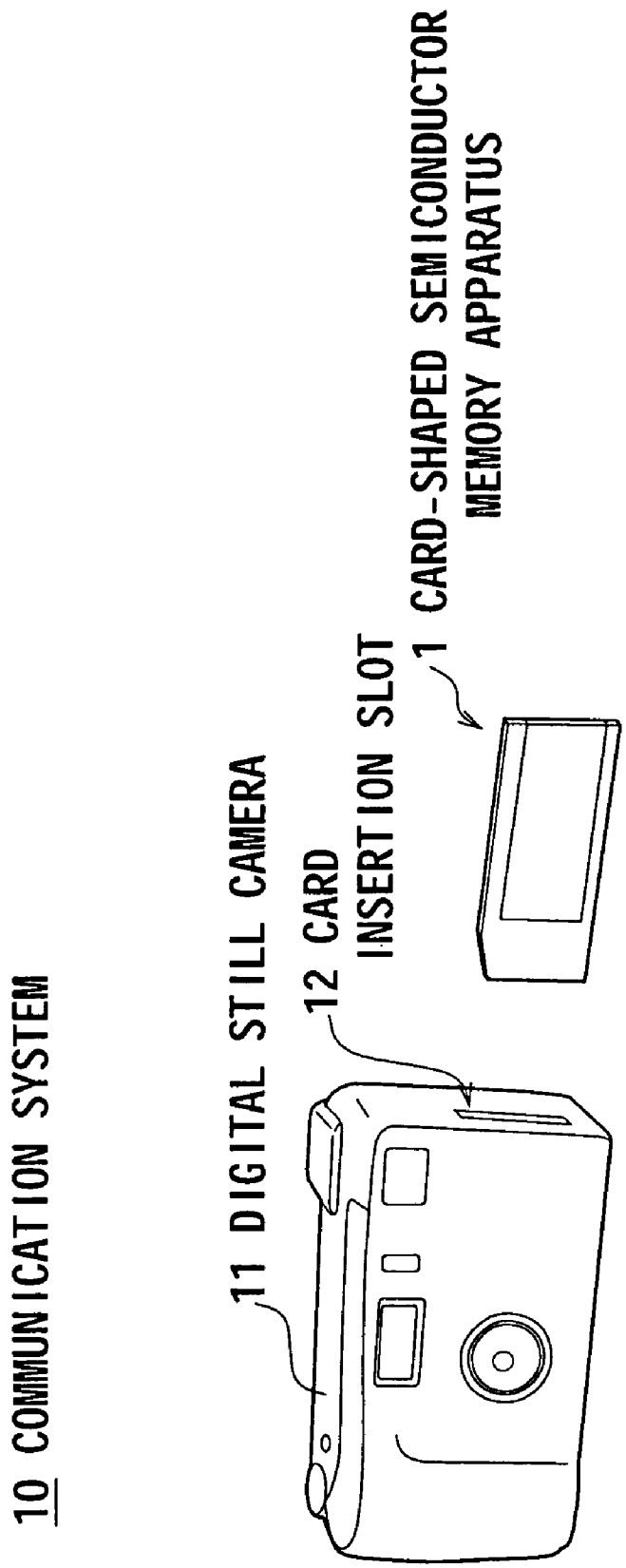
FIG. 7 is a schematic illustration of an embodiment of communication system according to one embodiment of the invention, showing the overall configuration thereof.

(1) Configuration of Digital Still Camera and that of Card-Shaped Semiconductor Memory Apparatus In FIG. 7, reference numeral 10 denotes the communication system as a whole. As a card-shaped semiconductor memory apparatus 1 is mounted in a digital still camera 11 as it is inserted into the card insertion slot 12 of the digital still camera 11. Then, as an image pickup process is executed to pick up an image of an object of shooting by the digital still camera 11, the video data obtained as a result of the image pickup process are transferred from the digital still camera 11 to the card-shaped semiconductor memory apparatus 1. At this time, the card-shaped semiconductor memory apparatus 1 stores the video data from the digital still camera 11 in a semiconductor memory arranged in the inside thereof.

As shown in FIGS. 8A and 8B, the card-shaped semiconductor memory apparatus 1 has a substantially box-shaped cabinet 2. The cabinet 2 has a plurality of belt-like terminals T (T1 through T14) arranged near one of the short sides of the cabinet 2 so as to be connected to the digital still camera 11 for data communications with the digital still camera 11.

Of the plurality of belt-like terminals T (T1 through T14), the first belt-like terminal T1 that is arranged at the lowermost end is extended in the longitudinal direction (as indicated by arrow a) of the cabinet 2 from the short side to a central part of the cabinet 2 to show a length greater than a predetermined length L and make it appear like a belt. The first belt-like terminal T1 is connected to the ground potential level when the card-shaped semiconductor memory apparatus 1 is connected to the digital still camera 11.

The second belt-like terminal T2 that is arranged immediately above the first belt-like terminal T1 with a predetermined gap separating them from each other is also extended in the longitudinal direction a of the cabinet 2 from the short side to a central part of the cabinet 2 to show a length greater than the predetermined length L and make it appear like a belt. The second belt-like terminal T2 is adapted to receive bus state signals from the digital still camera 11.

The third belt-like terminal T3 that is arranged immediately above the second belt-like terminal T2 with a predetermined gap separating them from each other is extended in the longitudinal direction a of the cabinet 2 from the short side to a central part of the cabinet 2 to secure a length at least as long as the length L and make it appear like a belt. Additionally, the eleventh belt-like terminal T11 is arranged at the central side of the cabinet 2 relative to the third belt-like terminal T3 with an insulating section 2A interposed between them and in array with the third belt-like terminal T3. The eleventh belt-like terminal T11 is also extended in the longitudinal direction a of the cabinet 2 to make it appear like a belt. The third belt-like terminal T3 and the eleventh belt-like terminal T11 are adapted to be used for inputting/outputting of data that are to be exchanged between the digital still camera and the card-shaped semiconductor memory apparatus 1.

The fourth belt-like terminal T4 that is arranged immediately above the third belt-like terminal T3 with a predetermined gap separating them from each other is extended in the longitudinal direction a of the cabinet 2 from the short side to a central part of the cabinet 2 to secure a length at least as long as the length L and make it appear like a belt. Additionally, the twelfth belt-like terminal T12 is arranged at the central side of the cabinet 2 relative to the fourth belt-like terminal T4 with an insulating section 2B interposed between them and in array with the fourth belt-like terminal T4. The twelfth belt-like terminal T12 is also extended in the longitudinal direction a of the cabinet 2 to make it appear like a belt. The fourth belt-like terminal T4 and the twelfth belt-like terminal T12 are adapted to be used for inputting/outputting of data that are to be exchanged between the digital still camera 11 and the card-shaped semiconductor memory apparatus 1

The fifth belt-like terminal T5 that is arranged immediately above the fourth belt-like terminal T4 with a predetermined gap separating them from each other is extended in the longitudinal direction a of the cabinet 2 from the short side to a central part of the cabinet 2 to secure a length at least as long as the length L and make it appear like a belt. Additionally, the thirteenth belt-like terminal T13 is arranged at the central side of the cabinet 2 relative to the fifth belt-like terminal T5 with an insulating section 2C interposed between them and in array with the fifth belt-like terminal T5. The thirteenth belt-like terminal T13 is also extended in the longitudinal direction a of the cabinet 2 to make it appear like a belt. The fifth belt-like terminal T5 and the thirteenth belt-like terminal T13 are adapted to be used for inputting/outputting of data that are to be exchanged between the digital still camera 11 and the card-shaped semiconductor memory apparatus 1.

The sixth belt-like terminal T6 that is arranged immediately above the fifth belt-like terminal T5 with a predetermined gap separating them from each other is also extended in the longitudinal direction a of the cabinet 2 from the short side to a central part of the cabinet 2 to show a length greater than the predetermined length L and make it appear like a belt. The sixth belt-like terminal T6 is adapted to be used to check if the card-shaped semiconductor memory apparatus 1 is mounted properly in the digital still camera 11 or not.

The seventh belt-like terminal T7 that is arranged immediately above the sixth belt-like terminal T6 with a predetermined gap separating them from each other is extended in the longitudinal direction a of the cabinet 2 from the short side to a central part of the cabinet 2 to secure a length at least as long as the length L and make it appear like a belt. Additionally, the fourteenth belt-like terminal T14 is arranged at the central side of the cabinet 2 relative to the seventh belt-like terminal T7 with an insulating section 2D interposed between them and in array with the seventh belt-like terminal T7. The fourteenth belt-like terminal T14 is also extended in the longitudinal direction a of the cabinet 2 to make it appear like a belt. The seventh belt-like terminal T7 and the fourteenth belt-like terminal T14 are adapted to be used for inputting/outputting of data that are to be exchanged between the digital still camera 11 and the card-shaped semiconductor memory apparatus 1.

The eighth belt-like terminal T8 that is arranged immediately above the seventh belt-like terminal T7 with a predetermined gap separating them from each other is also extended in the longitudinal direction a of the cabinet 2 from the short side to a central part of the cabinet 2 to show a length greater than the predetermined length L and make it appear like a belt. The eighth belt-like terminal T8 is adapted to receive clock signals from the digital still camera 11. The clock signals are used when communicating with the digital still camera 11.

The ninth belt-like terminal T9 that is arranged immediately above the eighth belt-like terminal T8 with a predetermined gap separating them from each other is also extended in the longitudinal direction a of the cabinet 2 from the short side to a central part of the cabinet 2 to show a length greater than the predetermined length L and make it appear like a belt. The ninth belt-like terminal T9 is a terminal to be used for receiving power supply from the digital still camera 11.

The tenth belt-like terminal T10 that is arranged immediately above the ninth belt-like terminal T9 with a predetermined gap separating them from each other is also extended in the longitudinal direction a of the cabinet 2 from the short side to a central part of the cabinet 2 to show a length greater than the predetermined length L and make it appear like a belt. The tenth belt-like terminal T10 is connected to the ground potential level when the card-shaped semiconductor memory apparatus 1 is connected to the digital still camera 11.

Figure 9:
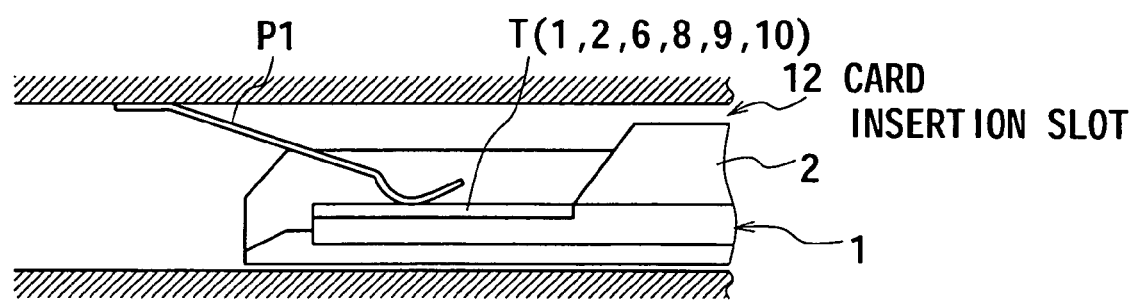
FIG. 9 is a schematic lateral view of a card-shaped semiconductor memory apparatus according to the embodiment of the invention and inserted into the card insertion slot of a digital still camera.
Figure 10:
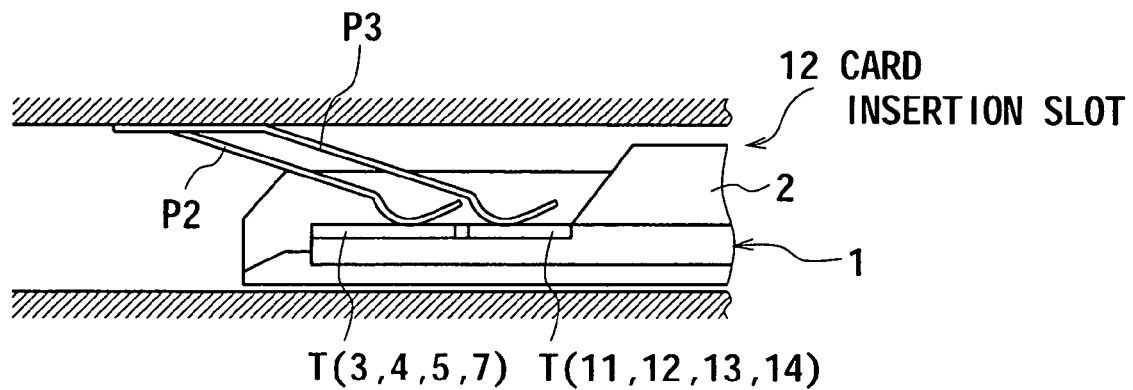
FIG. 10 is a schematic lateral view of a card-shaped semiconductor memory apparatus according to the embodiment of the invention and inserted into the card insertion slot of another digital still camera.

On the other hand, the card insertion slot 12 of the digital still camera 11 through which the card-shaped semiconductor memory apparatus 1 is inserted is provided with a plurality of terminal connecting sections P1 so as to correspond to the first, second, sixth, eighth, ninth and tenth belt-like terminals T (T1, T2, T6, T8, T9 and T10) of the card-shaped semiconductor memory apparatus 1 as shown in FIG. 9. Additionally, the card insertion slot 12 is also provided with a plurality of terminal connecting sections P2 so as to correspond to the third, fourth, fifth and seventh belt-like terminals T (T3, T4, T5 and T7) of the card-shaped semiconductor memory apparatus 1 and also with a plurality of terminal connecting sections P2 so as to correspond to the eleventh, twelfth, thirteenth and fourteenth belt-like terminals T (T11, T12, T13 and T14) of the card-shaped semiconductor memory apparatus 1 as shown in FIG. 10.

The card-shaped semiconductor memory apparatus 1 is inserted into the card insertion slot 12 along the longitudinal direction a of the cabinet 2 using the short side thereof as leading edge. Then, as a result, the plurality of terminal connecting sections P arranged in the card insertion slot 12 and the corresponding belt-like terminals T of the card-shaped semiconductor memory apparatus 1 are connected to each other respectively. In this way, the card-shaped semiconductor memory apparatus 1 is mounted in the digital still camera 11.

As a result, the control section of the digital still camera 11 can sequentially input the video data acquired typically by way of an image pickup process to the card-shaped semiconductor memory apparatus 1 by way of the terminal connecting sections P in the card insertion slot 12 and then the belt-like terminals T connected to them. At this time, the card-shaped semiconductor memory apparatus 1 causes the internal semiconductor memory to store the video data input from the digital still camera 11 by way of the belt-like terminals T.

Now, the circuit configuration of the card-shaped semiconductor memory apparatus 1 will be described by referring to FIG. 11. The card-shaped semiconductor memory apparatus 1 has a semiconductor memory section 20 having a nonvolatile memory such as a flash memory and a controller section 21 for executing read processes and write processes on the semiconductor memory section 20.

The controller section 21 has a micro processing unit (MPU) 22 that controls processes such as those described above. The MPU 22 is connected to a register section 23 that includes an IF_MODE register, an IF_SET register and the like, which will be described hereinafter, an error correcting circuit (ECC) section 24 for executing error correcting processes on the data read from and the data written to the semiconductor memory section 20 and a data buffer section 25 for temporarily storing the data read from and the data to be written to the semiconductor memory section 20.

The data buffer section 25 is connected to serial interface section 27 and parallel interface section 28 by way of a predetermined bus 26. The data input from the digital still camera 11 are input to the data buffer section 25 by way of the serial interface section 27 or the parallel interface section 28 and the MPU 22 writes the data input to the data buffer section 25 in the semiconductor memory section 20.

(2) Connection Arrangement

Figure 3:
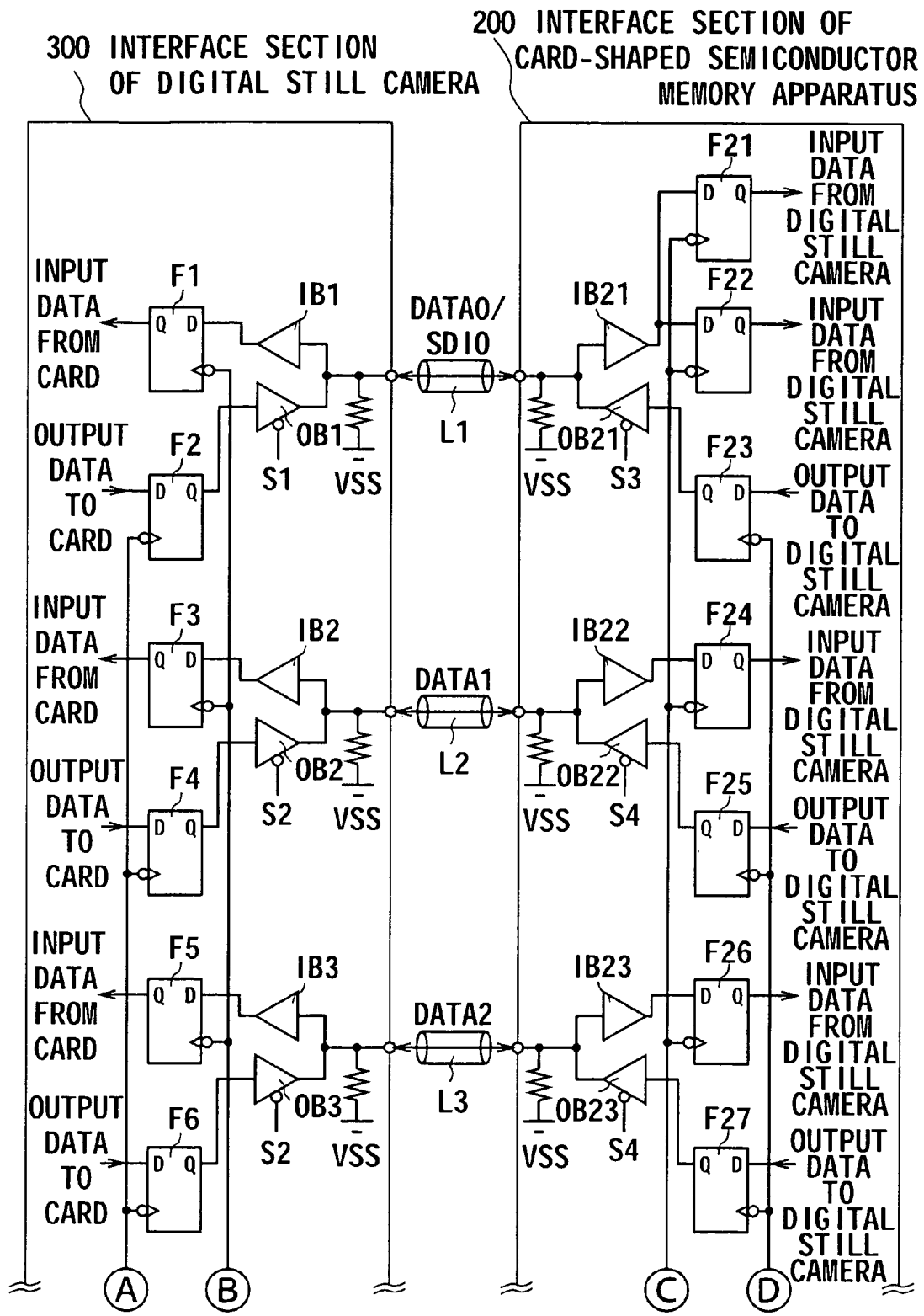
FIG. 3 is a schematic circuit diagram of the connection arrangement of a known digital still camera and a known card-shaped semiconductor memory apparatus.
Figure 4:
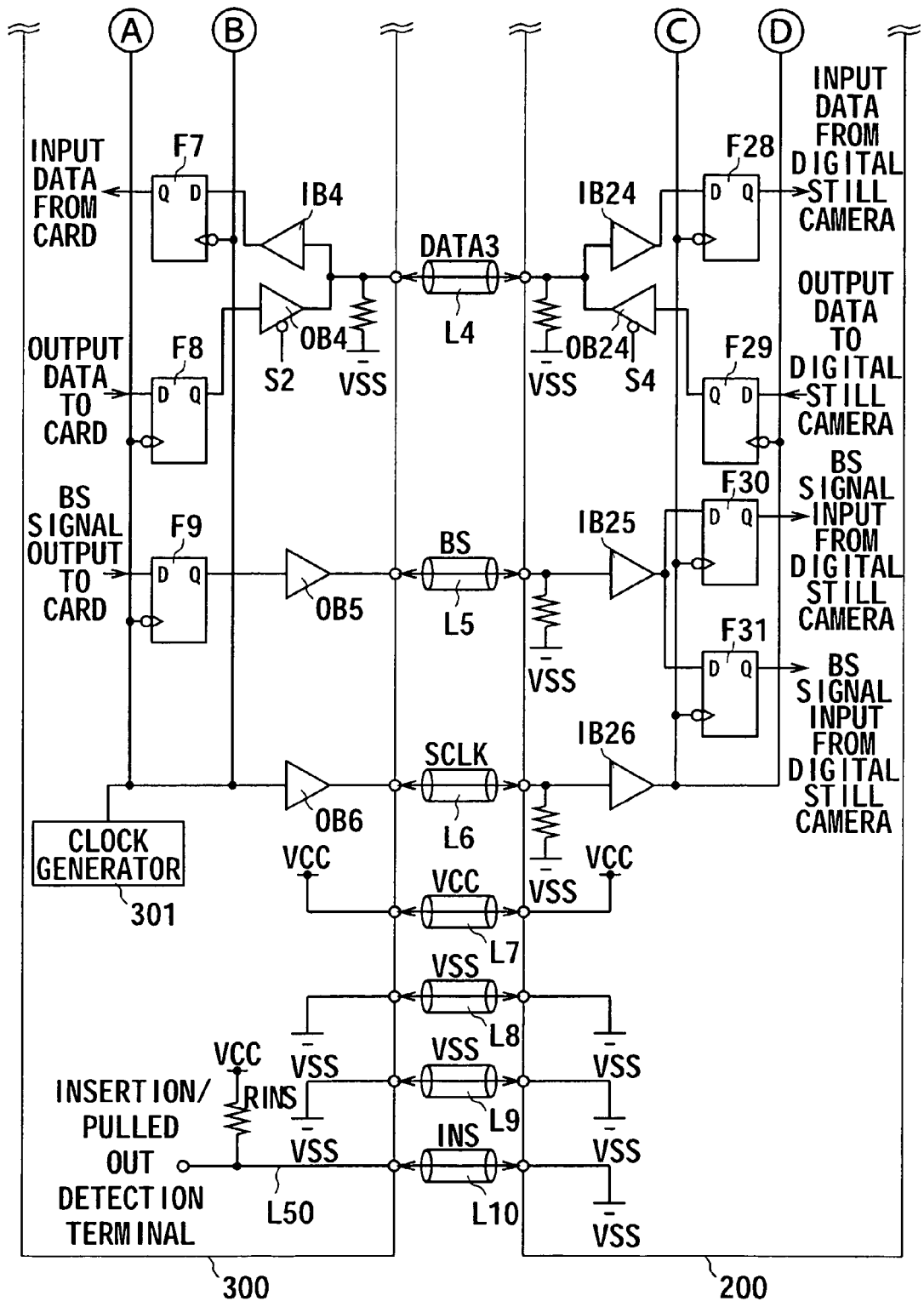
FIG. 4 is another schematic circuit diagram of the connection arrangement of a known digital still camera and a known card-shaped semiconductor memory apparatus.
Figure 5:
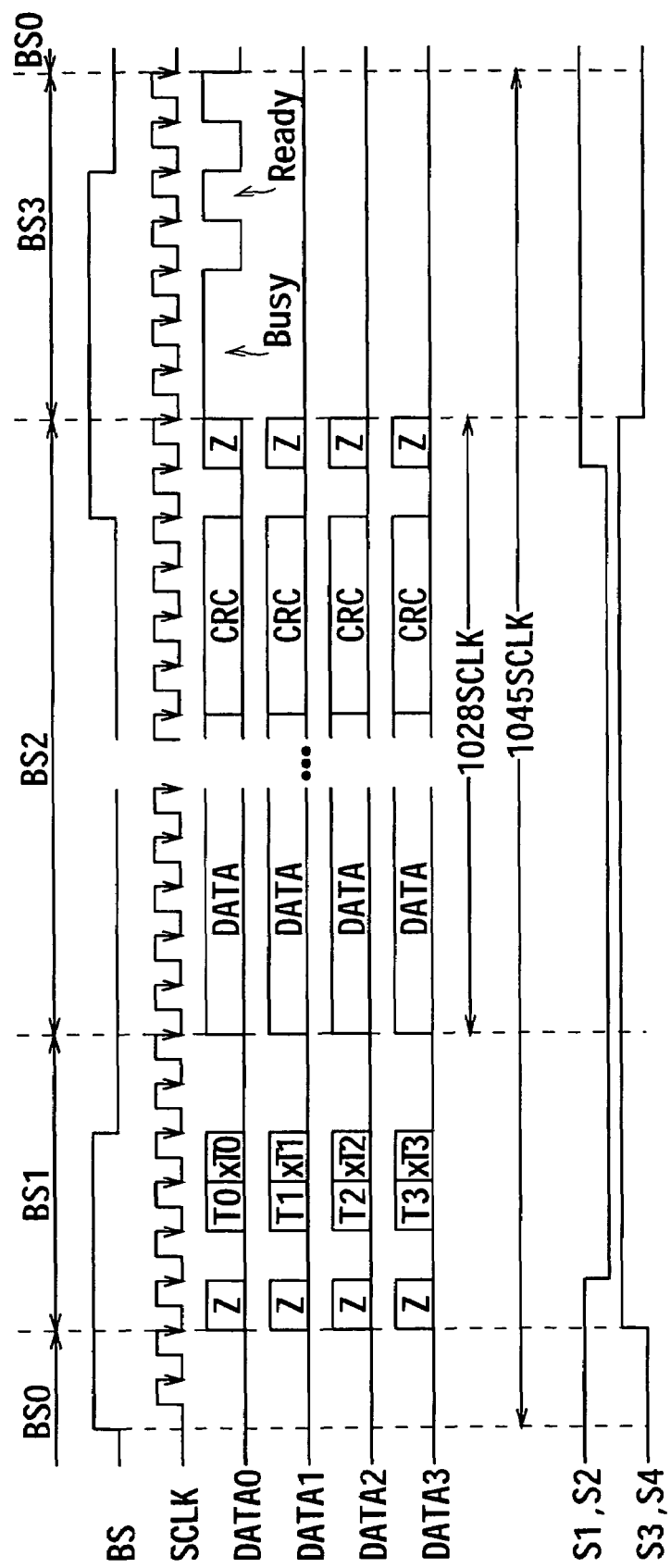
FIG. 5 is a timing chart that can be used when data are transferred for the purpose of writing data.
Figure 6:
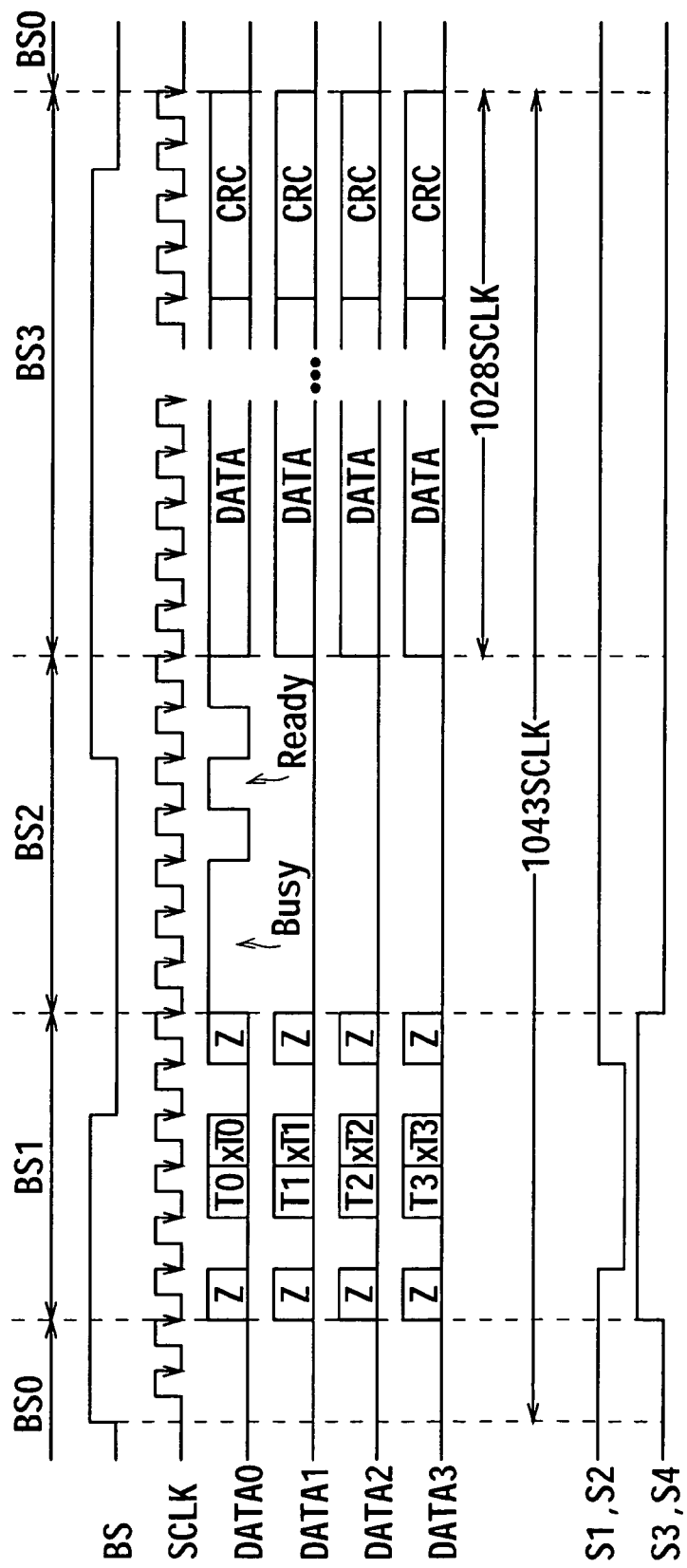
FIG. 6 is a timing chart that can be used when data are transferred for the purpose of reading data.
Figure 12:
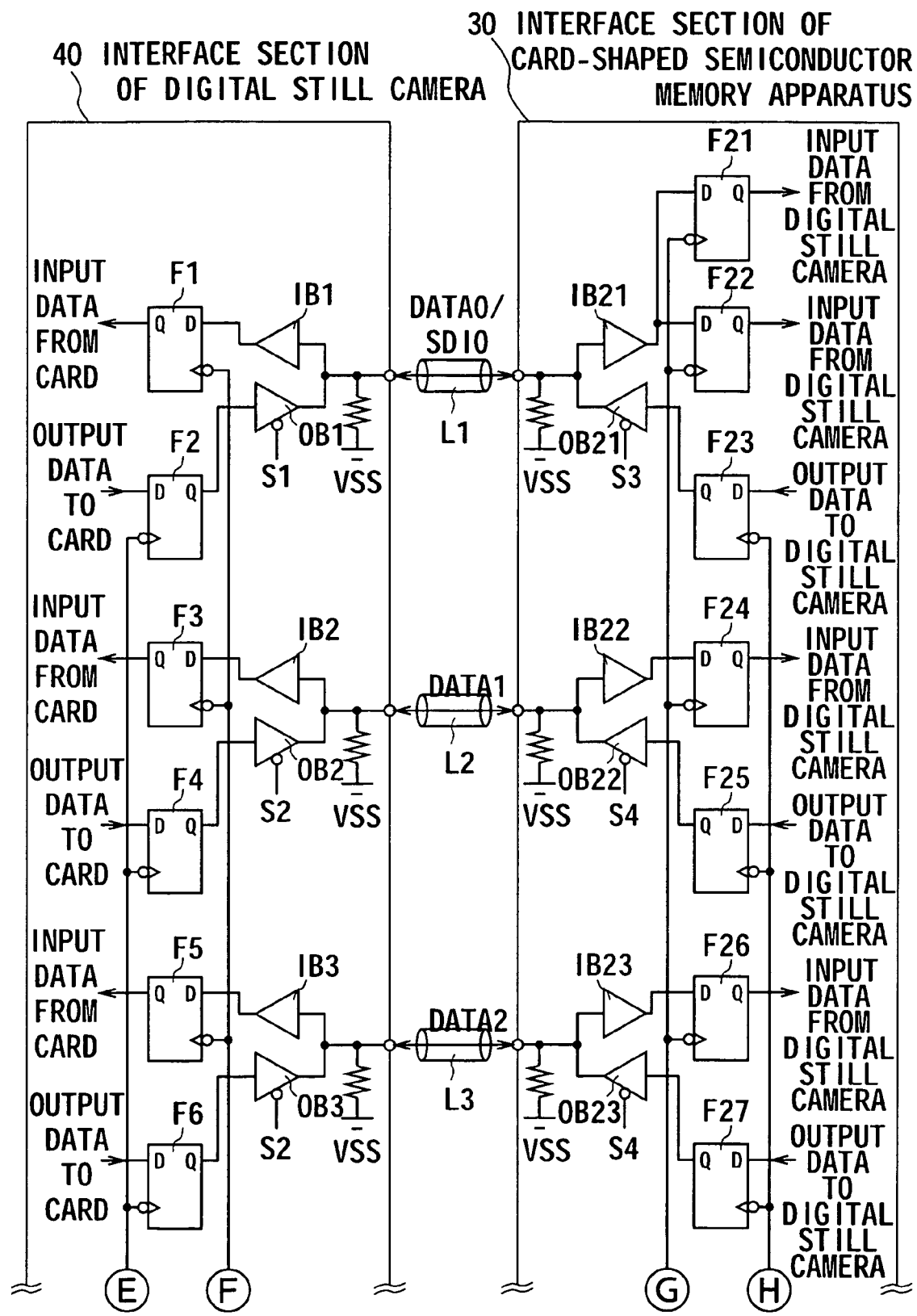
FIG. 12 is a schematic circuit diagram of the connection arrangement of a digital still camera and a card-shaped semiconductor memory apparatus according to the embodiment of the invention.
Figure 13:
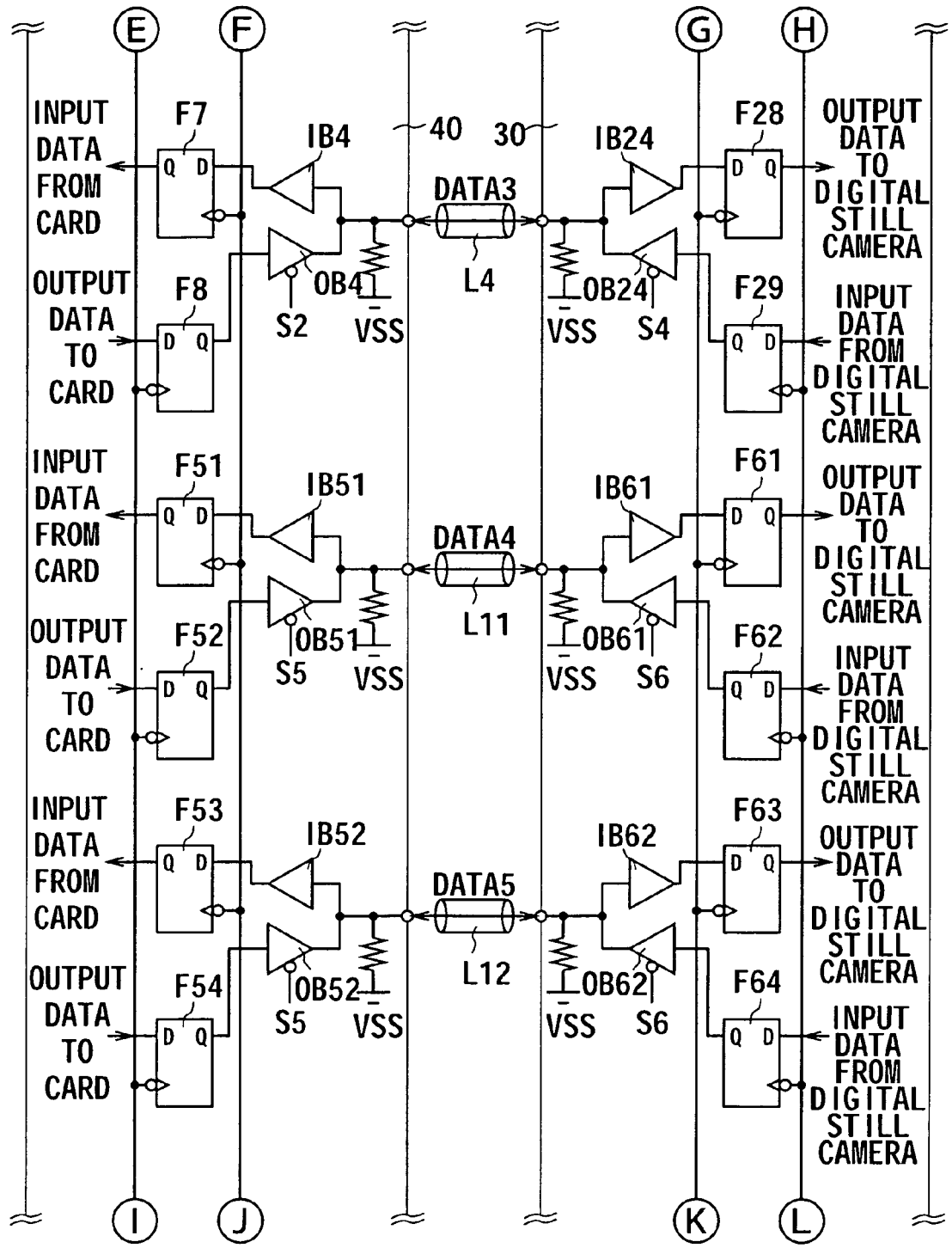
FIG. 13 is another schematic circuit diagram of the connection arrangement of a digital still camera and a card-shaped semiconductor memory apparatus according to the embodiment of the invention.
Figure 14:
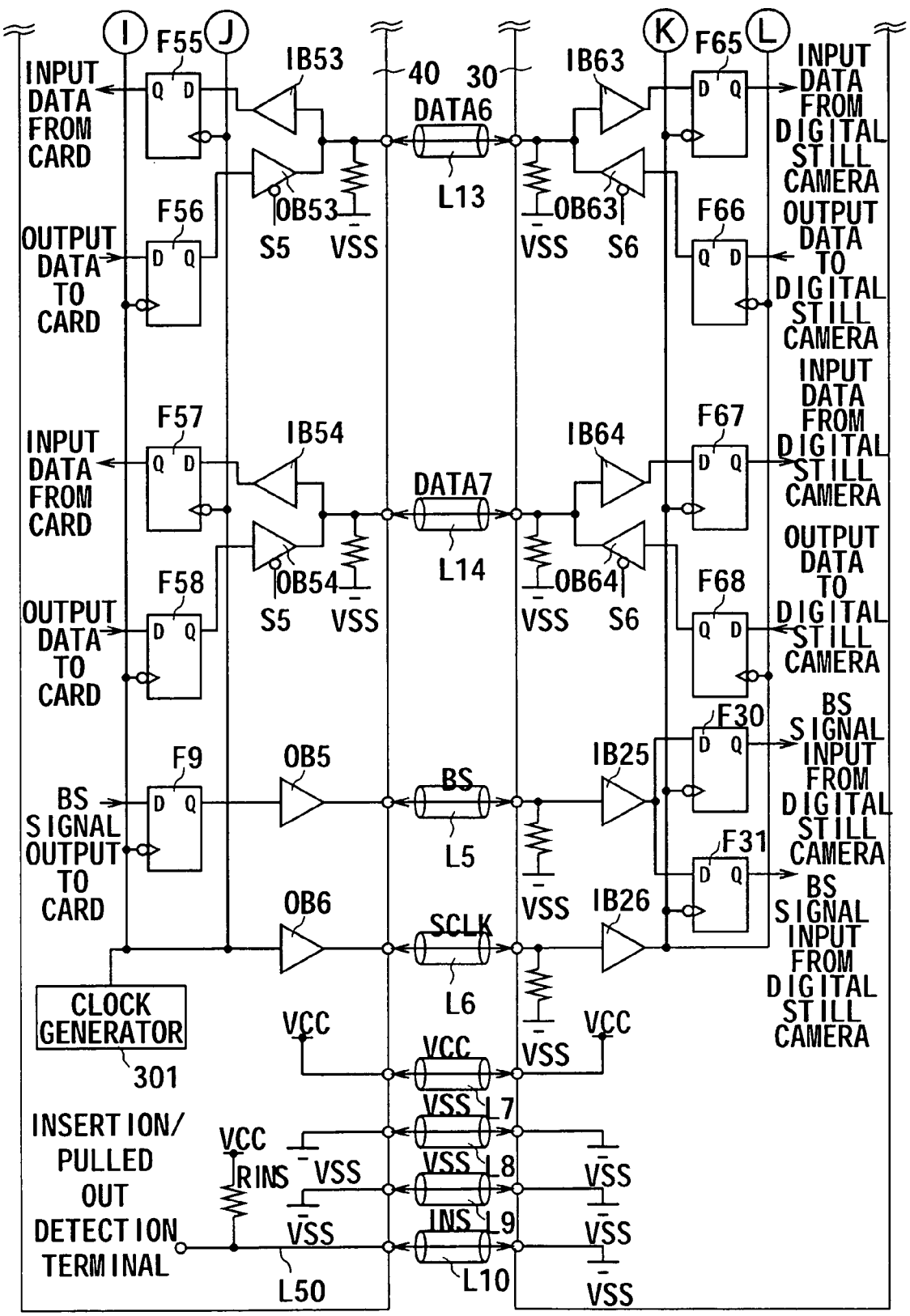
FIG. 14 is still another schematic circuit diagram of the connection arrangement of a digital still camera and a card-shaped semiconductor memory apparatus according to the embodiment of the invention.

Now, the connection arrangement for the card-shaped semiconductor memory apparatus 1 and the digital still camera 11 will be described in greater detail by referring to FIGS. 12, 13 and 14. In FIGS. 12, 13 and 14, the components that correspond respectively to those of FIGS. 3 and 4 are denoted by the same reference symbols. However, the components that are already described above by referring to FIGS. 3 and 4 will not be described here any further.

Figure 11:
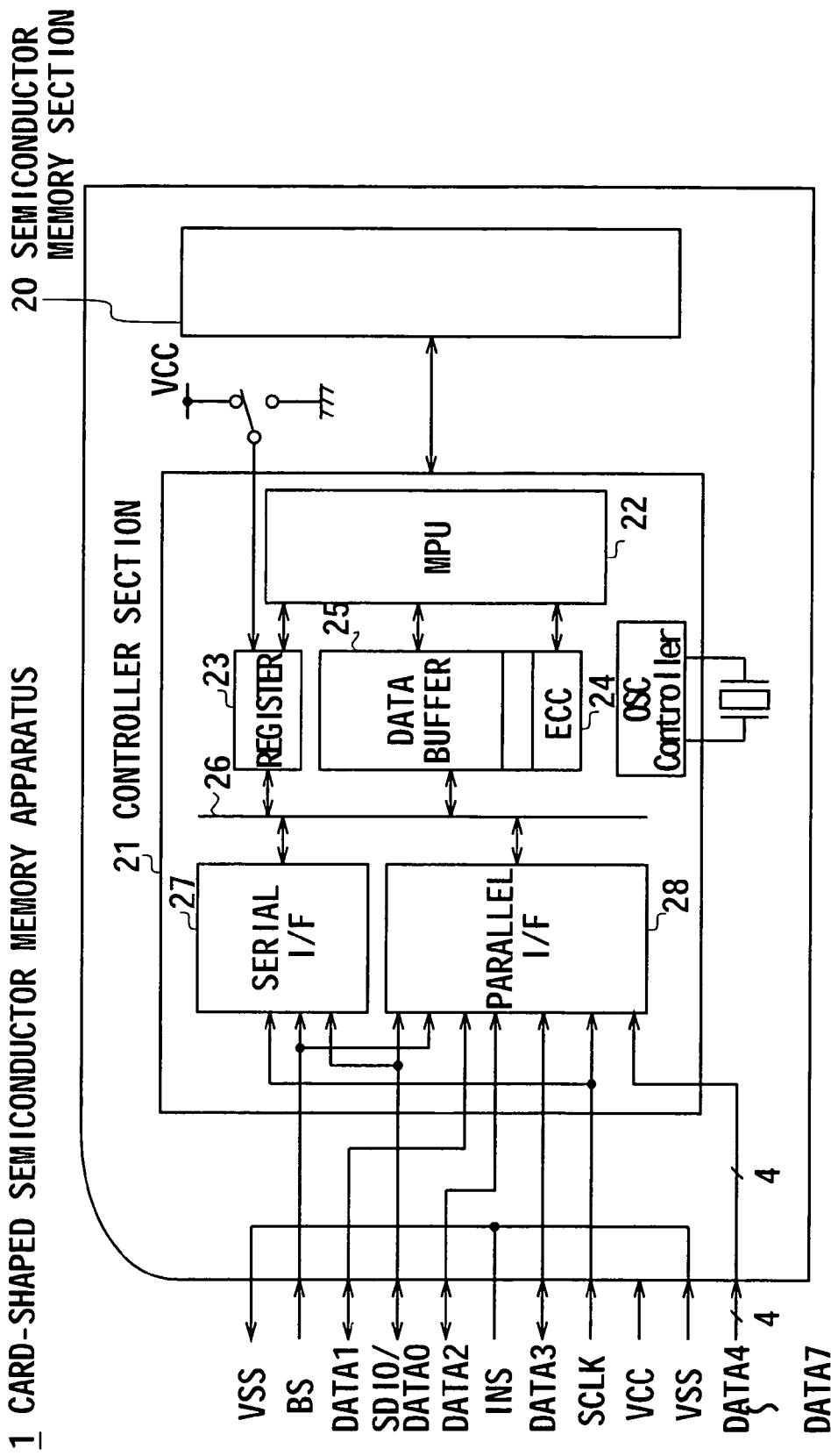
FIG. 11 is a schematic block diagram of a card-shaped semiconductor memory apparatus according to the embodiment of the invention, showing the circuit configuration thereof.

Note that, in this embodiment, the 21st flip-flop circuit F21 and the 30th flip-flop circuit F30 arranged in the interface section 30 of the card-shaped semiconductor memory apparatus 1 correspond to the serial interface section 27 illustrated in FIG. 11. Additionally, the 22nd through 29th flip-flop circuits F (F22 through F29), the 61st through 68th flip-flop circuit F (F61 through F68) and the 31st flip-flop circuit F31 arranged in the card-shaped semiconductor memory apparatus 1 correspond to the parallel interface section 28 illustrated in FIG. 11.

Eleventh through fourteenth connection lines L (L11 through L14) are provided in addition to the first through fourth connection lines L (L1 through L4) as transmission paths for exchanging data between the digital still camera 11 and the card-shaped semiconductor memory apparatus 1. With this arrangement, it is possible for digital still camera 11 and the card-shaped semiconductor memory apparatus 1 to transmit and receive 8-bit data simultaneously to consequently improve the data transfer rate without raising the frequency of the data transfer clock.

The eleventh connection line L11 is established when the twelfth belt-like terminal T12 of the card-shaped semiconductor memory apparatus 1 and the corresponding one of the terminal connecting sections P3 of the digital still camera 11 are connected to each other. Similarly, the twelfth, thirteenth and fourteenth connection lines L (L12, L13 and L14) are established when the eleventh, thirteenth and fourteenth belt-like terminals T (T11, T13 and T14) and the corresponding ones of the terminal connecting sections P3 of the digital still camera 11 are connected to each other respectively.

A 51st input buffer IB51 and a 51st output buffer OB51 are arranged in the interface section 40 of the digital still camera 11 so as to be connected to the eleventh connection line L11. The 51th input buffer IB51 inputs the data that is input to it from the card-shaped semiconductor memory apparatus 1 by way of the eleventh connection line L11 to a 51st flip-flop circuit F51 that is arranged immediately downstream relative to it. The 51st flip-flop circuit F511 takes in data from the card-shaped semiconductor memory apparatus 1 by latching the data from the 51st input buffer IB51 at the falling edge of the clock signal supplied from the clock generator 301 that is arranged in the digital still camera 11. On the other hand, the 51st output buffer OB51 is connected to a 52nd flip-flop circuit F52. The data to be transmitted to the card-shaped semiconductor memory apparatus 1 is input to the 52nd flip-flop circuit F52 from a predetermined circuit that is arranged immediately upstream relative to it. The 52nd flip-flop circuit F52 latches the data input from the predetermined circuit arranged immediately upstream to it at the falling edge of the clock signal supplied from the clock generator 301 and transmits it to the card-shaped semiconductor memory apparatus 1 by way of the 51st output buffer OB51 and then the eleventh connection line L11. Meanwhile, the 51st output buffer OB51 is designed to be switched from a data output ready state where data can be output from the 52nd flip-flop circuit F52 to the card-shaped semiconductor memory apparatus 1 to a data output suspended state where any output of data is suspended by a high impedance or vice versa according to the fifth switching control signal S5 supplied from a predetermined circuit in the digital still camera 11.

Additionally, a 52nd input buffer IB52 and a 52nd output buffer OB52 are arranged in the interface section 40 so as to be connected to the twelfth connection line L12. The 52nd input buffer IB52 is connected to a 53rd flip-flop circuit F53 that operates like the above described 51st flip-flop circuit F51. The 52nd output buffer OB52 is connected to a 54th flip-flop circuit F54 that operates like the above described 52nd flip-flop circuit F52. Meanwhile, the 52nd output buffer OB52 is designed to be switched from a data output ready state to a data output suspended state or vice versa according to the fifth switching control signal S5 supplied from the predetermined circuit in the digital still camera 11.

Still additionally, a 53rd input buffer IB53 and a 53rd output buffer OB53 are arranged in the interface section 40 so as to be connected to the thirteenth connection line L13. The 53rd input buffer IB53 is connected to a 55th flip-flop circuit F55 that operates like the above described 51st flip-flop circuit F51. The 53rd output buffer OB53 is connected to a 56th flip-flop circuit F56 that operates like the above described 52nd flip-flop circuit F52. Meanwhile, the 53rd output buffer OB53 is designed to be switched from a data output ready state to a data output suspended state or vice versa according to the fifth switching control signal S5 supplied from the predetermined circuit in the digital still camera 11.

Furthermore, a 54th input buffer IB54 and a 54th output buffer OB54 are arranged in the interface section 40 so as to be connected to the fourteenth connection line L14. The 54th input buffer IB54 is connected to a 57th flip-flop circuit F57 that operates like the above-described 51st flip-flop circuit F51. The 54th output buffer OB54 is connected to a 58th flip-flop circuit F58 that operates like the above described 52nd flip-flop circuit F52. Meanwhile, the 54th output buffer OB54 is designed to be switched from a data output ready state to a data output suspended state or vice versa according to the fifth switching control signal S5 supplied from the predetermined circuit in the digital still camera 11.

On the other hand, a 61st input buffer IB61 and a 61st output buffer OB61 are arranged in the interface section 30 of the card-shaped semiconductor memory apparatus 1 so as to be connected to the eleventh connection line L11. The 61st input buffer IB61 inputs the data that is input to it from the digital still camera 11 by way of the eleventh connection line L11 to the 61st flip-flop circuits F61 that is arranged immediately downstream relative to it. The 61st flip-flop circuit F61 takes in data from the digital still camera 11 by latching the data from the 61st input buffer IB61 at the rising edge of the clock signal supplied from the clock generator 301 that is arranged in the digital still camera 11 by way of the sixth connection line L6 and then a 26th input buffer IB26. On the other hand, the 61st output buffer OB61 is connected to a 62nd flip-flop circuit F62. The data to be transmitted to the digital still camera 11 is input to the 62nd flip-flop circuit F62 from the circuit arranged immediately upstream relative to it. The 62nd flip-flop circuit F62 latches the data input from the immediately upstream circuit and transmits it to the digital still camera 11 by way of the 61st output buffer OB61 and then the eleventh connection line L11 at the falling edge of the clock signal supplied from the clock generator 301 of the digital still camera 11 by way of the sixth connection line L6. Meanwhile, the 61st output buffer OB61 is designed to be switched from a data output ready state where data can be output from the 62nd flip-flop circuit F62 to the digital still camera 11 to a data output suspended state where any output of data is suspended by a high impedance or vice versa according to the sixth switching control signal S6 supplied from a predetermined circuit in the card-shaped semiconductor memory apparatus 1.

Additionally, a 62nd input buffer IB62 and a 62nd output buffer OB62 are arranged in the interface section 30 so as to be connected to the twelfth connection line L12. The 62nd input buffer IB62 is connected to a 63rd flip-flop circuit F63 that operates like the above described 61st flip-flop circuit F61. The 62nd output buffer OB62 is connected to a 64th flip-flop circuit F64 that operates like the above-described 62nd flip-flop circuit F62. Meanwhile, the 62nd output buffer OB62 is designed to be switched from a data output ready state to a data output suspended state or vice versa according to the sixth switching control signal S6 supplied from the predetermined circuit in the card-shaped semiconductor memory apparatus 1.

Still additionally, a 63rd input buffer IB63 and a 63rd output buffer OB63 are arranged in the interface section 30 so as to be connected to the thirteenth connection line L13. The 63rd input buffer IB63 is connected to a 65th flip-flop circuit F65 that operates like the above described 61st flip-flop circuit F61. The 63rd output buffer OB63 is connected to a 66th flip-flop circuit F66 that operates like the above described 62nd flip-flop circuit F62. Meanwhile, the 63rd output buffer OB63 is designed to be switched from a data output ready state to a data output suspended state or vice versa according to the sixth switching control signal S6 supplied from the predetermined circuit in the card-shaped semiconductor memory apparatus 1.

Furthermore, a 64th input buffer IB64 and a 64th output buffer OB64 are arranged in the interface section 30 so as to be connected to the fourteenth connection line L14. The 64th input buffer IB64 is connected to a 67th flip-flop circuit F67 that operates like the above-described 61st flip-flop circuit F61. The 64th output buffer OB64 is connected to a 68th flip-flop circuit F68 that operates like the above described 62nd flip-flop circuit F62. Meanwhile, the 64th output buffer OB64 is designed to be switched from a data output ready state to a data output suspended state or vice versa according to the sixth switching control signal S6 supplied from the predetermined circuit in the card-shaped semiconductor memory apparatus 1.

Meanwhile, three modes are provided for data communications between the digital still camera 11 and the card-shaped semiconductor memory apparatus 1 in this embodiment. One of the three modes is a serial transfer mode for transferring 1-bit data by utilizing only the first connection line L1. Another one of the three modes is a 4-bit parallel transfer mode for transferring 4-bit data by utilizing the first through fourth connection lines L (L1 through L4). The last one of the three modes is an 8-bit parallel transfer mode for transferring 8-bit data by utilizing the first through fourth connection lines L (L1 through L4) and the eleventh through fourteenth connection lines L (L11 through L14).

The operation in a serial transfer mode and the operation in a 4-bit parallel transfer mode of the embodiment are same as those described above by referring to FIGS. 3 and 4. Therefore, only an 8-bit parallel transfer mode will be described in detail below.

When data are transmitted from the digital still camera 11 to the card-shaped semiconductor memory apparatus 1 in an 8-bit parallel transfer mode, the first output buffer OB1, the second through fourth output buffers OB (OB2 through OB4) and the 51st through 54th output buffers OB (OB51 through OB54) are brought into a data output ready state respectively by the first switching control signal S1, the second switching control signal S2 and the fifth switching control signal S5 supplied from a predetermined circuit in the digital still camera 11 to the first output buffer OB1, the second through fourth output buffers OB (OB2 through OB4) and the 51st through 54th output buffers OB (OB51 through OB54).

At this time, in the card-shaped semiconductor memory apparatus 1, the 21st output buffer OB21, the 22nd through 24th output buffers OB (OB22 through OB24) and the 61st through 64th output buffers OB (OB61 through OB64) are brought into a data output suspended state respectively by the third switching control signal S3, the fourth switching control signal S4 and the sixth switching control signal S6 supplied from a predetermined circuit in the card-shaped semiconductor memory apparatus 1 to the 21st output buffer OB21, the 22nd through 24th output buffers OB (OB22 through OB24) and the 61st through 64th output buffers OB (OB61 through OB64).

As a result, in the digital still camera 11, the data of a total of eight bits output respectively from eight flip-flop circuits F (F2, F4, F6, F8, F52, F54, F56 and F58) so as to be transmitted to the card-shaped semiconductor memory apparatus 1 are actually input to the card-shaped semiconductor memory apparatus 1 respectively by way of the corresponding output buffers OB (OB1, OB2, OB3, OB4, OB51, OB52, OB53 and OB54) and then corresponding connection lines L (L1, L2, L3, L4, L11, L12, L13 and L14). At this time, in the card-shaped semiconductor memory apparatus 1, the data of a total of eight bits input to it from the digital still camera 11 respectively by way of the corresponding connection lines L (L1, L2, L3, L4, L11, L12, L13 and L14) are taken in by the corresponding flip-flop circuits F (F22, F24, F26, F28, F61, F63, F65 and F67) by way of the corresponding input buffers IB (IB21, IB22, IB23, IB24, IB61, IB62, IB63 and IB64).

When, on the other hand, data are transmitted from the card-shaped semiconductor memory apparatus 1 to the digital still camera 11 in an 8-bit parallel transfer mode, the first output buffer OB1, the second through fourth output buffers OB (OB2 through OB4) and the 51st through 54th output buffers OB (OB51 through OB54) are brought into a data output suspended state in the digital still camera 11 respectively by the first switching control signal S1, the second switching control signal S2 and the fifth switching control signal S5 supplied from a predetermined circuit of the digital still camera 11 to the first output buffer OB1, the second through fourth output buffers OB (OB2 through OB4) and the 51st through 54th output buffers OB (OB51 through OB54).

At this time, in the card-shaped semiconductor memory apparatus 1, the 21st output buffer OB21, the 22nd through 24th output buffers OB (OB22 through OB24) and the 61st through 64th output buffers OB (OB61 through OB64) are brought into a data output ready state respectively by the third switching control signal S3, the fourth switching control signal S4 and the sixth switching control signal S6 supplied from a predetermined circuit in the card-shaped semiconductor memory apparatus 1 to the 21st output buffer OB21, the 22nd through 24th output buffers OB (OB22 through OB24) and the 61st through 64th output buffers OB (OB61 through OB64).

As a result, in the card-shaped semiconductor memory apparatus 1, the data of a total of eight bits output from the related flip-flop circuits F (F23, F25, F27, F29, F62, F64, F66 and F68) so as to be transmitted to the digital still camera 11 are input to the digital still camera 11 respectively by way of the corresponding output buffers OB (OB21, OB22, OB23, OB24, OB61, OB62, OB63 and OB64) and then the corresponding connection lines L (L1, L2, L3, L4, L11, L12, L13 and L14). At this time, in the digital still camera 11, the data of a total of eight bits input from the card-shaped semiconductor memory apparatus 1 by way of the connection lines L (L1, L2, L3, L4, L11, L12, L13 and L14) are taken in by the corresponding flip-flop circuits F (F1, F3, F5, F7, F51, F53, F55 and F57) by way of the corresponding input buffers IB (IB1, IB2, IB3, IB4, IB51, IB52, IB53 and IB54).

A data communication is conducted between the digital still camera 11 and the card-shaped semiconductor memory apparatus 1 in an 8-bit parallel transfer mode by utilizing the first through fourth connection lines L (L1 through L4) and the eleventh through fourteenth connection lines L (L11 through L14) in a manner as described above. Note that, if the maximum frequency of the clock signals generated by the clock generator 301 is 40 MHz like the system in related art, the maximum data transfer rate between the digital still camera 11 and the card-shaped semiconductor memory apparatus 1 can be made to be equal to 320 Mbps, which is twice as high as the maximum data transfer rate in related art.

(3) Timing Charts

Figure 15:
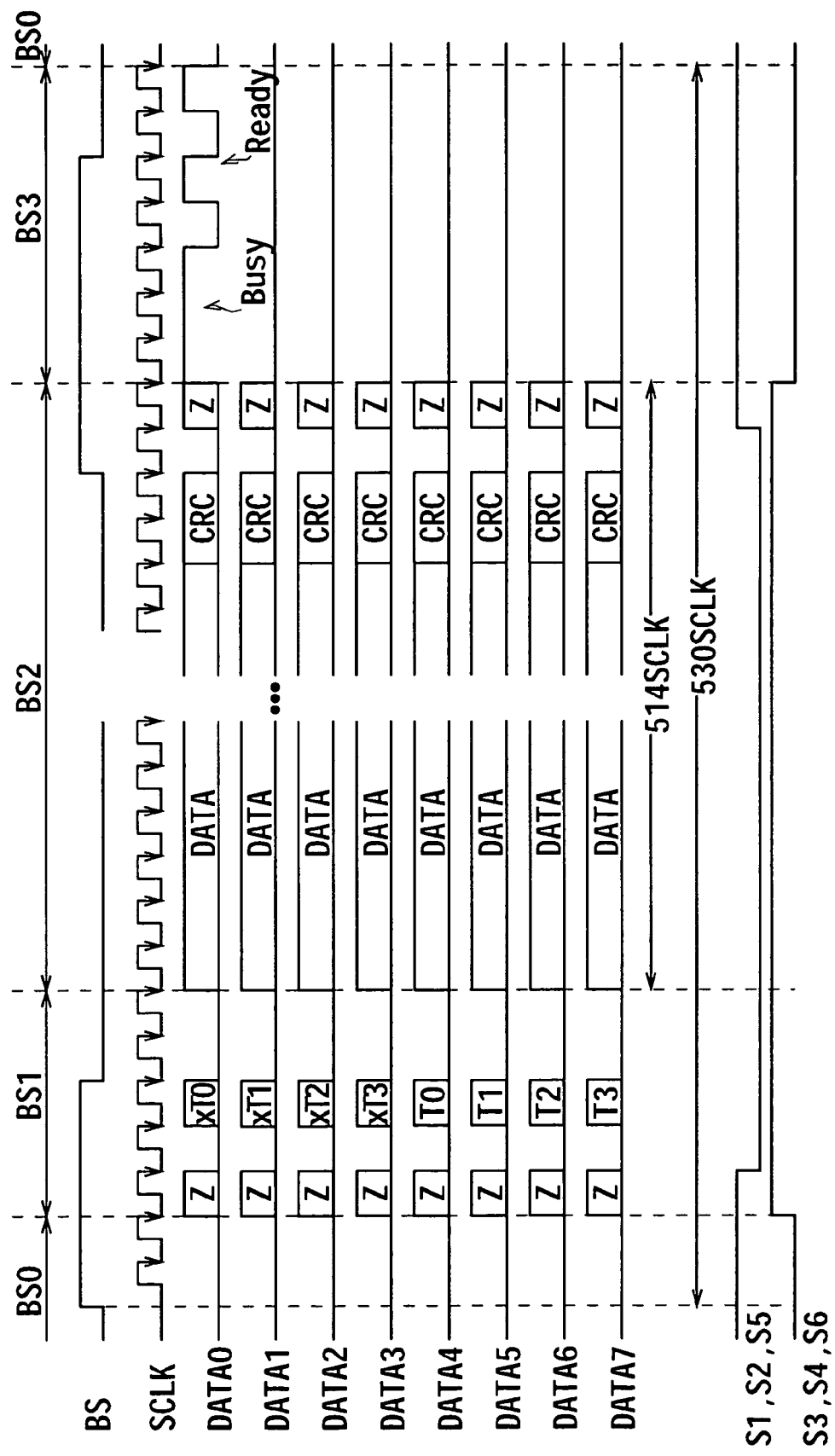
FIG. 15 is a timing chart that can be used when data are transferred for the purpose of writing data.
Figure 16:
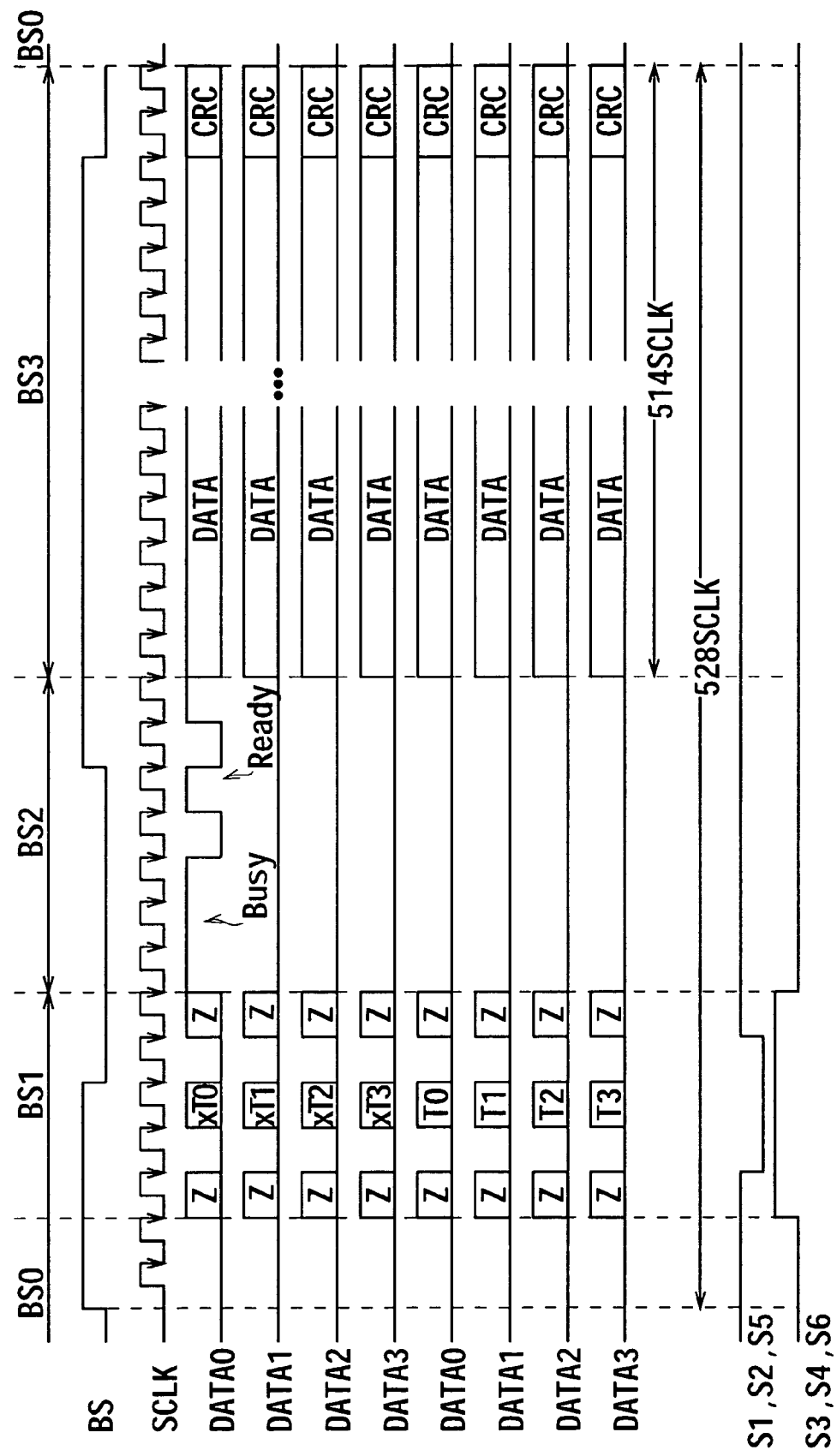
FIG. 16 is a timing chart that can be used when data are transferred for the purpose of reading data.

FIGS. 15 and 16 are timing charts that can be used in an 8-bit parallel transfer mode for the purpose of the present invention.

The data communication between the digital still camera 11 and the card-shaped semiconductor memory apparatus 1 is divided into four states by a bus state signal input from the digital still camera 11 to the card-shaped semiconductor memory apparatus 1 by way of the fifth connection line L5 (and the four states are referred to as "bus state BS0", "bus state BS1", "bus state BS2" and "bus state BS3" so as to correspond to the timing chart).

Note that a bus state signal is input to the card-shaped semiconductor memory apparatus 1 sequentially by way of the ninth flip-flop circuit F9, the fifth output buffer OB5 and the fifth connection line L5 of the digital still camera 11. The card-shaped semiconductor memory apparatus 1 is adapted to take in the input bus state signal by means of the 31st flip-flop circuit F31 by way of the 25th input buffer IB25.

Firstly, an operation of transferring data from the digital still camera 11 to the card-shaped semiconductor memory apparatus 1 will be described by referring to FIG. 15. Note that the timing chart of FIG. 15 is applicable to a write operation where data transmitted from the digital still camera 11 are written into the card-shaped semiconductor memory apparatus 1.

The bus state BS0 is an idle state where no data communication takes place between the digital still camera 11 and the card-shaped semiconductor memory apparatus 1. When the state moves into the succeeding bus state BS1, the third switching control signal S3, the fourth switching control signal S4 and the sixth switching control signal S6 in the card-shaped semiconductor memory apparatus 1 rise to bring the 21st output buffer OB21, the 22nd through 24th output buffers OB (OB22 through OB24) and the 61st through 64th output buffers OB (OB61 through OB64) into a data output suspended state. Additionally, since the first switching control signal S1, the second switching control signal S2 and the fifth switching control signal S5 in the digital still camera 11 fall 1-clock thereafter, the first output buffer OB1, the second through fourth output buffers OB (OB2 through OB4) and the 51st through 54th output buffers (OB51 through OB54) are brought into a data output ready state.

In the bus state BS1, a predetermined command (transfer protocol command (TPC)) is transferred from the digital still camera 11 to the card-shaped semiconductor memory apparatus 1. The predetermined command may indicate that data are to be transferred from the digital still camera 11 to the card-shaped semiconductor memory apparatus 1 (so as to be written in the latter) or from the card-shaped semiconductor memory apparatus 1 to the digital still camera 11 (so as to be read from the former).

In the instance of FIG. 15, the command indicates that data are to be transferred from the digital still camera 11 to the card-shaped semiconductor memory apparatus 1 (so as to be written in the latter). Therefore, in the succeeding bus state BS2, data are transferred from the digital still camera 11 to the card-shaped semiconductor memory apparatus 1.

Subsequently, when moving into the bus state BS3, since the first switching control signal S1, the second switching control signal S2 and the fifth switching control signal S5 in the digital still camera 11 rise 1-clock before, the first output buffer OB1, the second through fourth output buffers OB (OB2 through OB4) and the 51st through 54th output buffers OB (OB51 through OB54) are brought into a data output suspended state. Then, since the third switching control signal S3, the fourth switching control signal S4 and the sixth switching control signal S6 in the card-shaped semiconductor memory apparatus 1 fall 1-clock thereafter, the 21st output buffer OB21, the 22nd through 24th output buffers OB (OB22 through OB24) and the 61st through 64th output buffers OB (OB61 through OB64) are brought into a data output ready state.

In the bus state BS3, firstly, a busy signal is transmitted from the card-shaped semiconductor memory apparatus 1 to the digital still camera 11. During the period of transmission of the busy signal, the card-shaped semiconductor memory apparatus 1 executes a process including an operation of adding an error correction code to the data received from the digital still camera 11 and other operations. When the process is completed, the card-shaped semiconductor memory apparatus 1 transmits a ready signal to the digital still camera 11.

In this way, data are transferred from the digital still camera 11 to the card-shaped semiconductor memory apparatus 1. In the following, the part of the data transmitted from the digital still camera 11 to the card-shaped semiconductor memory apparatus 1 that correspond to the bus states BS0 through BS3 is referred to as write packet.

FIG. 16 is a timing chart that can be used when data are transferred from the card-shaped semiconductor memory apparatus 1 to the digital still camera 11. Note that this timing chart is applicable to a read operation where data are read by the digital still camera 11 from the card-shaped semiconductor memory apparatus 1.

In the bus state BS1, a predetermined command is issued to indicate that data are to be transferred from the card-shaped semiconductor memory apparatus 1 to the digital still camera 11 (so as to be read from the former).

In the instance of FIG. 16, when moving from the bus state BS1 to the bus state BS2, since the first switching control signal S1, the second switching control signal S2 and the fifth switching control signal S5 in the digital still camera 11 rise 1-clock before, the first output buffer OB1, the second through fourth output buffers OB (OB2 through OB4) and the 51st through 54th output buffers OB (OB51 through OB54) are brought into a data output suspended state. Then, since the third switching control signal S3, the fourth switching control signal S4 and the sixth switching control signal S6 in the card-shaped semiconductor memory apparatus 1 fall 1-clock thereafter, the 21st output buffer OB21, the 22nd through 24th output buffers OB (OB22 through OB24) and the 61st through 64th output buffers OB (OB61 through OB64) are brought into a data output ready state.

In the bus state BS2, firstly, a busy signal is transmitted from the card-shaped semiconductor memory apparatus 1 to the digital still camera 11. During the period of transmission of the busy signal, the card-shaped semiconductor memory apparatus 1 executes a preparation process for transmitting data to the digital still camera 11. When the preparation process is completed, the card-shaped semiconductor memory apparatus 1 transmits a ready signal to the digital still camera 11. As the bus state moves from the bus state BS2 to the bus state BS3 in response to the transmission of the ready signal, data are transmitted from the card-shaped semiconductor memory apparatus 1 to the digital still camera 11.

In this way, data are transferred from the card-shaped semiconductor memory apparatus 1 to the digital still camera 11. In the following, the part of the data transmitted from the card-shaped semiconductor memory apparatus 1 to the digital still camera 11 that correspond to the bus states BS0 through BS3 is referred to as read packet.

In actuality, when the card-shaped semiconductor memory apparatus 1 is inserted into the card insertion slot 12 and mounted in position, the control section of the digital still camera 11 starts an operation of data communication in a serial transfer mode. Then, the control section of the digital still camera 11 reads out the value of the IF_MODE register stored in the register section 23 in the card-shaped semiconductor memory apparatus 1.

Then, if the control section of the digital still camera 11 recognizes that the mounted card-shaped semiconductor memory apparatus 1 is adapted to an 8-bit parallel transfer mode as a result of referring to the value of the IF_MODE register it has read out, it executes a data communication process of transmitting and receiving data of 8 bits at a time in an 8-bit parallel transfer mode, utilizing the first through fourth connection lines L (L1 through L4) and the eleventh through fourteenth connection lines L (L11 through L14) established between digital still camera 11 and the card-shaped semiconductor memory apparatus 1.

(4) Selection of Data Transfer Mode

Now, the sequence RT1 of a data transfer mode selection process will be described below by referring to the flow chart of FIG. 17. In a data transfer mode selection process, the digital still camera 11 selects one of the three data transfer modes (serial transfer mode, 4-bit parallel transfer mode and 8-bit parallel transfer mode) and conducts an operation of data communication with the mounted card-shaped semiconductor memory apparatus 1 in the selected data transfer mode.

Figure 17:
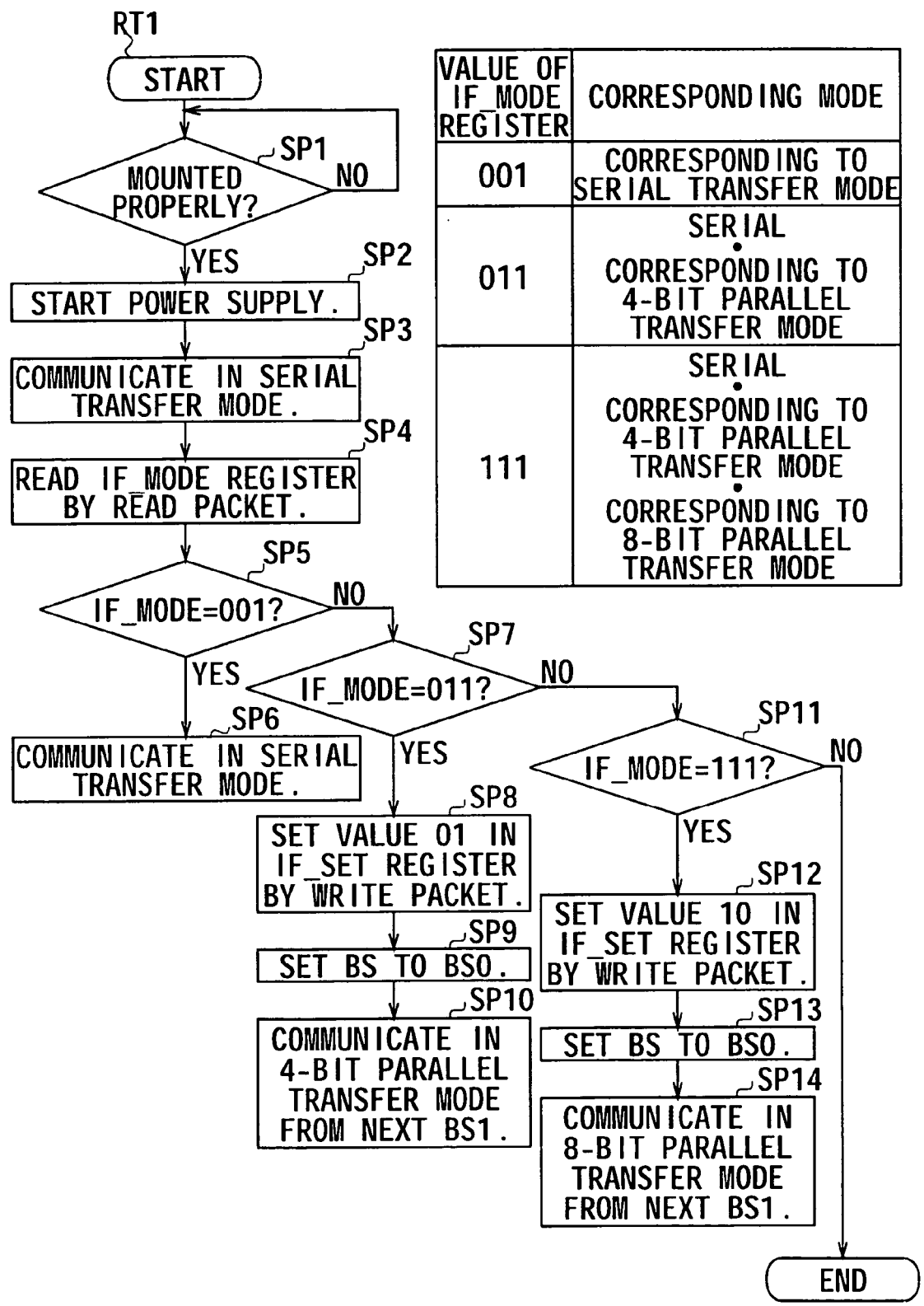
FIG. 17 is a flow chart illustrating the sequence of a data transfer mode selection process.

Referring to FIG. 17, the control section of the digital still camera 11 determines in Step SP1 if the card-shaped semiconductor memory apparatus 1 is properly inserted into the card insertion slot 12 or not on the basis of the electric potential of the line L50 connected to the tenth connection line L10.

If a negative acknowledgement is obtained in Step SP1, it means that the card-shaped semiconductor memory apparatus 1 is not properly mounted in the digital still camera 11 and hence the control section of the digital still camera 11 waits for the proper attachment of the card-shaped semiconductor memory apparatus 1.

On the other hand, if a positive acknowledgement is obtained in Step SP1, it means that the card-shaped semiconductor memory apparatus 1 is properly mounted in the digital still camera 11, and hence the control section of the digital still camera 11 proceeds to the next step, or Step SP2.

In Step SP2, the control section of the digital still camera 11 starts supplying power to the card-shaped semiconductor memory apparatus 1 by way of the seventh connection line L7 and proceeds to the next step, or Step SP3, where it starts data communication with the card-shaped semiconductor memory apparatus 1 in a serial transfer mode for utilizing only the first connection line L1.

Then, the control section of the digital still camera 11 proceeds to Step SP4, where it reads out the value of the IF_MODE register stored in the register section 23 in the card-shaped semiconductor memory apparatus 1 by way of the first connection line L1.

Thereafter, the control section of the digital still camera 11 proceeds to Step SP5, where it determines if the value of the IF_MODE register it has read out is equal to "001" or not.

If a positive acknowledgement is obtained in Step SP5, it means that the card-shaped semiconductor memory apparatus 1 mounted in the digital still camera 11 is adapted only to a serial transfer mode. Therefore, the control section of the digital still camera 11 proceeds to Step SP6 to continue the data communication in the serial transfer mode.

If, on the other hand, a negative acknowledgement is obtained in Step SP5, the control section of the digital still camera 11 proceeds to Step SP7. Then, the control section of the digital still camera 11 determines if the value of the IF_MODE register it has read out is equal to "011" or not in Step SP7.

If a positive acknowledgement is obtained in Step SP7, it means that the card-shaped semiconductor memory apparatus 1 mounted in the digital still camera 11 is adapted to a serial transfer mode and a 4-bit parallel transfer mode. Therefore, the control section of the digital still camera 11 proceeds to Step SP8, where it writes the value of "01", for example, of the IF_SET register to the register section 23 of the card-shaped semiconductor memory apparatus 1 by means of the above described write packet.

The value of "01" of the IF_SET register indicates that an operation of data communication is to be conducted in a 4-bit parallel transfer mode between the digital still camera 11 and the card-shaped semiconductor memory apparatus 1. Thus, the card-shaped semiconductor memory apparatus 1 can recognize that an operation of data communication is to be conducted with the digital still camera 11 in a 4-bit parallel transfer mode on the basis of the written value of "01" of the IF_SET register. Then, as a result, it controls its own interface section 30 so as to operate for data communication in a 4-bit parallel transfer mode.

Now, the control section of the digital still camera 11 moves to the next step, or Step SP9, where it sets the bus state to the bus state BS0 by means of the bus state signal to be transmitted to the card-shaped semiconductor memory apparatus 1, and subsequently proceeds to Step SP10, where it starts an operation of data communication with the card-shaped semiconductor memory apparatus 1 in a 4-bit parallel transfer mode from the next bus state BS1.

If, on the other hand, a negative acknowledgement is obtained in Step SP7, the control section of the digital still camera 11 proceeds to Step SP11. Then, in Step SP11, the control section of the digital still camera 11 determines if the value of the IF_MODE register it has read out is equal to "111" or not.

If a positive acknowledgement is obtained in Step SP11, it means that the card-shaped semiconductor memory apparatus 1 mounted in the digital still camera 11 is adapted to a serial transfer mode, a 4-bit parallel transfer mode and an 8-bit parallel transfer mode. Then, the control section of the digital still camera 11 proceeds to Step SP12, where it writes the value of "10", for example, of the IF_SET register to the register section 23 of the card-shaped semiconductor memory apparatus 1 by means of the above described write packet.

The value of "10" of the IF_SET register indicates that an operation of data communication is to be conducted in an 8-bit parallel transfer mode between the digital still camera 11 and the card-shaped semiconductor memory apparatus 1. Thus, the card-shaped semiconductor memory apparatus 1 can recognize that an operation of data communication is to be conducted with the digital still camera 11 in an 8-bit parallel transfer mode on the basis of the written value of "10" of the IF_SET register. Then, as a result, it controls its own interface section 30 so as to operate for data communication in an 8-bit parallel transfer mode.

Now, the control section of the digital still camera 11 moves to the next step, or Step SP13, where it sets the bus state to the bus state BS0 by means of the bus state signal to be transmitted to the card-shaped semiconductor memory apparatus 1, and subsequently proceeds to Step SP14, where it starts an operation of data communication with the card-shaped semiconductor memory apparatus 1 in an 8-bit parallel transfer mode from the next bus state BS1.

If, on the other hand, a negative acknowledgement is obtained in Step SP11, the control section of the digital still camera 11 suspends the power supply to the card-shaped semiconductor memory apparatus 1 and terminates the sequence RT1 of a data transfer mode selection process.

(5) Operation and Advantages

Thus, as described above, the card-shaped semiconductor memory apparatus 1 is provided with eleventh, twelfth, thirteenth and fourteenth belt-like terminals T (T11, T12, T13 and T14) in addition to the third, fourth, fifth and seventh belt-like terminals T (T3, T4, T5 and T7) arranged at an end of the cabinet 2 for the purpose of transmitting data to and receiving data from the digital still camera 11.

With this arrangement, the number of terminals for exchanging data with the digital still camera 11 is increased from four to eight so that it is possible to improve the data transfer rate without raising the frequency of the data transfer clock (the clock signal generated by the clock generator 301).

The eleventh, twelfth, thirteenth and fourteenth belt-like terminals T (T11, T12, T13 and T14) are not interposed among the existing belt-like terminals T (T1 through T10) but arranged respectively at central sides of the third, fourth, fifth and seventh belt-like terminals T (T3, T4, T5 and T7) and aligned with the latter in the card-shaped semiconductor memory apparatus 1. With this arrangement, the third, fourth, fifth and seventh belt-like terminals T (T3, T4, T5 and T7) of the card-shaped semiconductor memory apparatus 1 are arranged at respective positions same as those of card-shaped semiconductor memory apparatus in related art from the viewpoint of the cabinet 2. The remaining belt-like terminals of the card-shaped semiconductor memory apparatus 1 are also arranged at respective positions same as those of card-shaped semiconductor memory apparatus in related art.

Figures 1A, 1B:
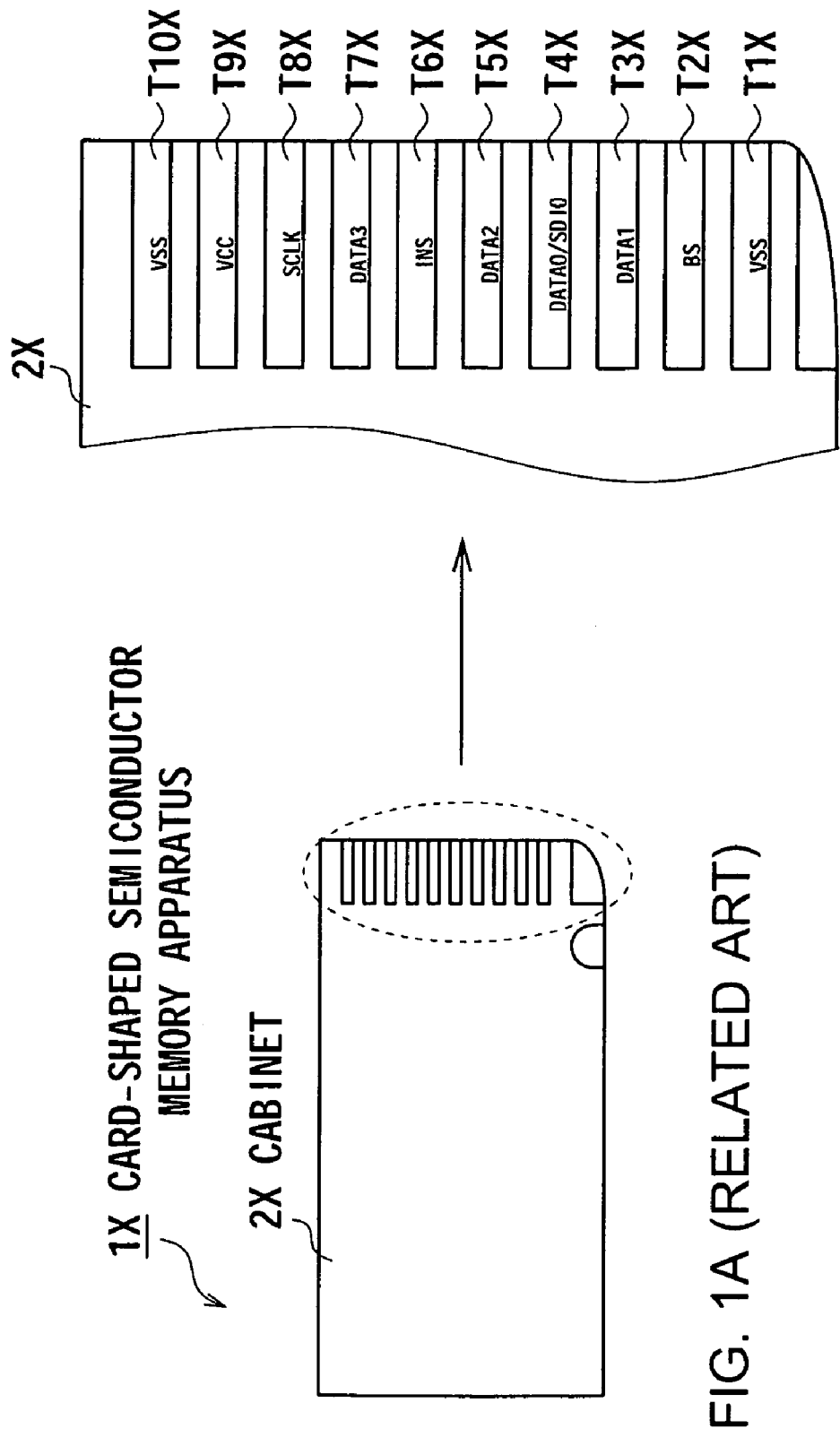
FIGS. 1A and 1B are schematic illustrations of a known card-shaped semiconductor memory apparatus, showing its configuration.
Figure 2:
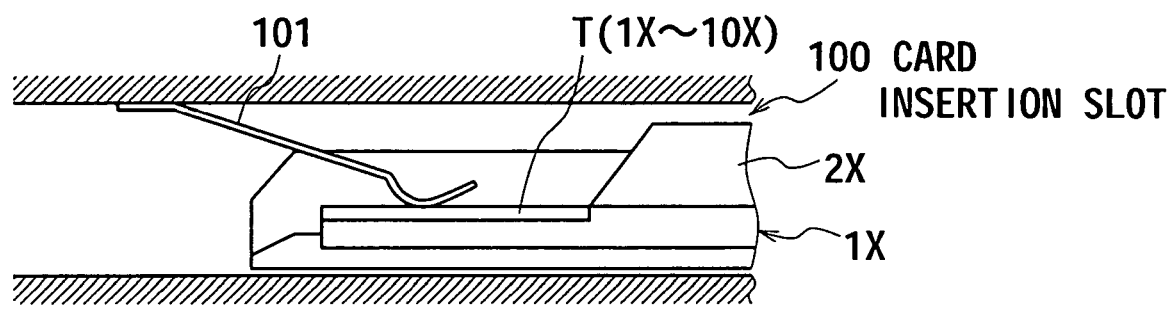
FIG. 2 is a schematic lateral view of a known card-shaped semiconductor memory apparatus inserted into the card insertion slot.
Figure 8:
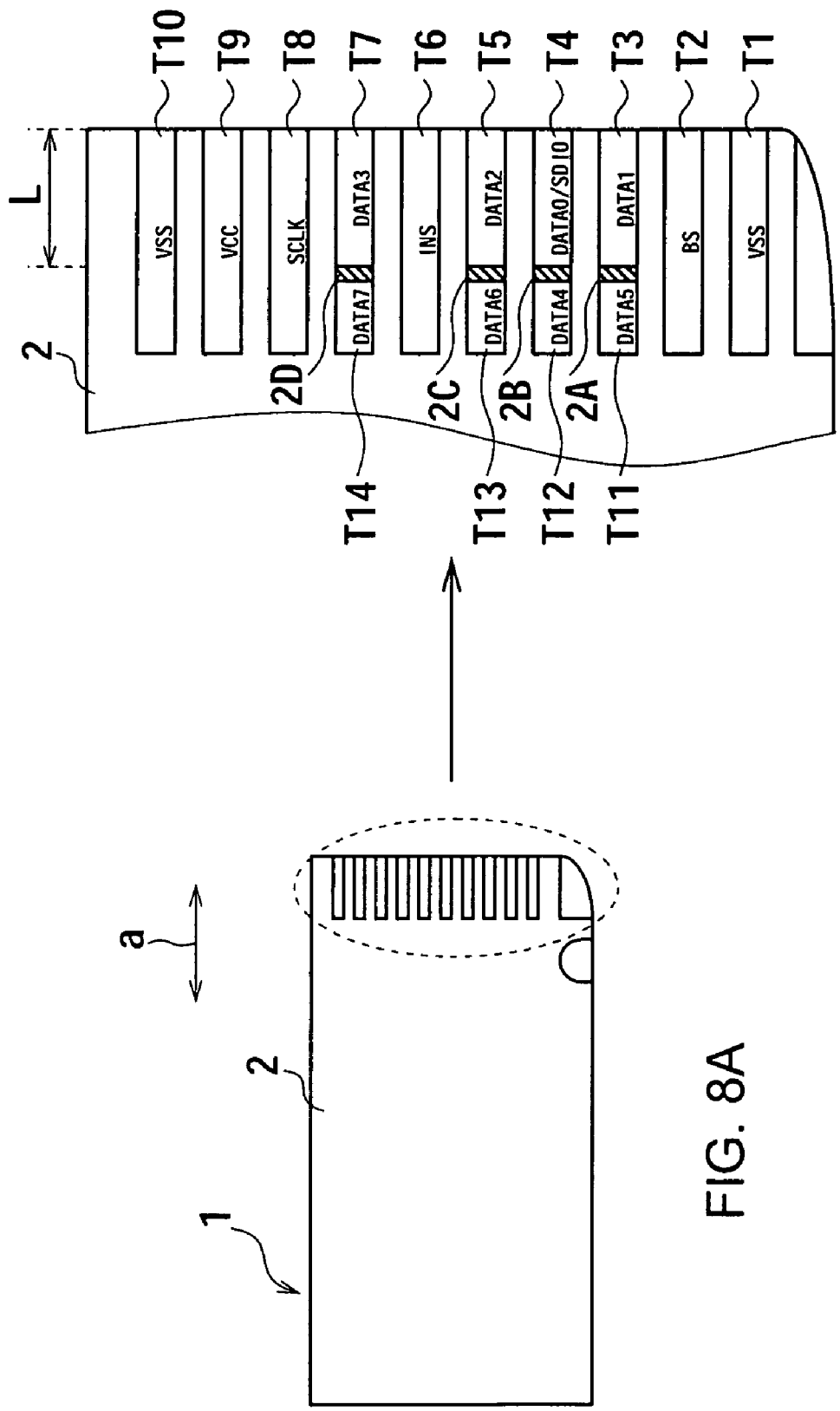
FIGS. 8A and 8B are schematic illustrations of an embodiment of card-shaped semiconductor memory apparatus according to the embodiment of the invention, showing its configuration.

As shown in FIG. 8, the third, fourth, fifth and seventh belt-like terminals T (T3, T4, T5 and T7) are extended in the longitudinal direction of the cabinet 2 from a short side to a central part of the cabinet 2 to show a length greater than the predetermined length L and the eleventh, twelfth, thirteenth and fourteenth belt-like terminals T (T11, T12, T13 and T14) are arranged at the central side of the cabinet 2 relative to them respectively. The terminal connecting sections 101 of the digital still camera in related art illustrated in FIG. 2 are adapted to be connected respectively to the corresponding belt-like terminals T within a range of the length L from the short side of the cabinet 2X of the card-shaped semiconductor memory apparatus 1X. Therefore, when the card-shaped semiconductor memory apparatus 1 of this embodiment is mounted in the digital still camera in related art, the related terminal connecting sections 101 of the digital still camera in related art are reliably connected to the third, fourth, fifth and seventh belt-like terminals T (T3, T4, T5 and T7) without touching the eleventh, twelfth, thirteenth and fourteenth belt-like terminals T (T11, T12, T13 and T14).

Thus, the card-shaped semiconductor memory apparatus 1 can be inserted into the card insertion slot 100 of the digital still camera in related art that is adapted only to a serial transfer mode and a 4-bit parallel transfer mode for use. Additionally, when it is inserted in the digital still camera in related art, the first through tenth belt-like terminals T (T1 through T10) are reliably connected to the respective terminal connecting sections 101 of the digital still camera in related art.

As a result, the card-shaped semiconductor memory apparatus 1 is comparable with the card-shaped semiconductor memory apparatus 1X in related art in terms of the profile of the cabinet 2 and the positional arrangement of the terminals.

Additionally, the first and tenth belt-like terminals T (T1 and T10) of the card-shaped semiconductor memory apparatus 1 that are arranged at respective positions same as those of their counterparts of the card-shaped semiconductor memory apparatus 1X in related art operate as terminals (VSS) for making the digital still camera 11 and the card-shaped semiconductor memory apparatus 1 show the same ground potential level and the ninth belt-like terminal T9 of the card-shaped semiconductor memory apparatus 1 that is arranged at a position same as that of its counterpart of the card-shaped semiconductor memory apparatus 1X in related art operates as terminal (VCC) for receiving power supply from the digital still camera 11. The voltage range of the power supply is between 2.7 and 3.6 V, which is same as the voltage range of the card-shaped semiconductor memory apparatus 1X in related art.

Thus, the card-shaped semiconductor memory apparatus 1 is compatible with the card-shaped semiconductor memory apparatus 1X in related art in terms of power supply.

Still additionally, the sixth belt-like terminal T6 of the card-shaped semiconductor memory apparatus 1 that is arranged at a position same as that of its counterpart of the card-shaped semiconductor memory apparatus 1X in related art operates as terminal (INS) for detecting if the card-shaped semiconductor memory apparatus 1X is properly mounted in the electronic appliance or not. The technique for detecting the properly mounted condition is an related art.

Thus, the card-shaped semiconductor memory apparatus 1 is compatible with the card-shaped semiconductor memory apparatus 1X in related art in terms of detecting if the card-shaped semiconductor memory apparatus 1X is properly mounted in the electronic appliance or not.

As described earlier by referring to the flow chart of FIG. 17, the digital still camera 11 starts data communication with the card-shaped semiconductor memory apparatus 1 in a serial transfer mode when the card-shaped semiconductor memory apparatus 1 is properly mounted in it. Then, the digital still camera 11 starts data communication with the card-shaped semiconductor memory apparatus 1 in an 8-bit parallel transfer mode only when the value of the IF_MODE register it has read out from the register section 23 of the card-shaped semiconductor memory apparatus 1 is equal to "111" but it starts data communication in a data transfer mode ("serial transfer mode" or "4-bit parallel transfer mode") that is available in the card-shaped semiconductor memory apparatus 1X in related art when the value of the IF_MODE register is other than "111" ("001" or "011").

Thus, the digital still camera 11 can reliably communicate not only with the card-shaped semiconductor memory apparatus 1 of this embodiment but with the card-shaped semiconductor memory apparatus 1X in related art for data communications.

Therefore, the number of terminals of the card-shaped semiconductor memory apparatus 1 that can be used to communicate with the digital still camera 11 for data communications is increased from four to eight while the card-shaped semiconductor memory apparatus 1 is compatible with the card-shaped semiconductor memory apparatus 1X in related art. Thus, it is possible to realize a card-shaped semiconductor memory apparatus 1 that can improve the data transfer rate without raising the frequency of the data transfer clock.

The card-shaped semiconductor memory apparatus 1 of this embodiment is adapted to bring the 22nd through 24th output buffers OB (OB22 through OB24) and the 61st through 64th output buffers OB (OB61 through OB64) into a data output suspended state by means of the third switching control signal S3 and the sixth switching control signal S6 when communicating with the digital still camera 11 in a serial transfer mode for data communications. Additionally, the digital still camera 11 is adapted to bring the second through fourth output buffers OB (OB2 through OB4) and the 51st through 54th output buffers OB (OB51 through OB54) into a data output suspended state by means of the second switching control signal S2 and the fifth switching control signal S5 when communicating with the card-shaped semiconductor memory apparatus 1 in a serial transfer mode for data communications. Therefore, the use of connection lines other than the first connection line L1 for unnecessary transmission/reception of data is reliably avoided in a serial transfer mode. In other words, the card-shaped semiconductor memory apparatus 1 is reliably prevented from giving rise to operation errors.

Additionally, the card-shaped semiconductor memory apparatus 1 of this embodiment is adapted to bring the 61st through 64th output buffers OB (OB61 through OB64) into a data output suspended state by means of the sixth switching control signal S6 when communicating with the digital still camera 11 in a 4-bit parallel transfer mode for data communications, while the digital still camera 11 is adapted to bring the 51st through 54th output buffers OB (OB51 through OB54) into a data output suspended state by means of the fifth switching control signal S5 when communicating with the card-shaped semiconductor memory apparatus 1 in a 4-bit parallel transfer mode for data communications. Therefore, the use of connection lines other than the first through fourth connection lines L (L1 through L4) for unnecessary transmission/reception of data is reliably avoided in a 4-bit parallel transfer mode. In other words, the card-shaped semiconductor memory apparatus 1 is reliably prevented from giving rise to operation errors.

(6) Other Embodiments

While the electronic appliance that communicates with the above described embodiment of card-shaped semiconductor memory apparatus 1 is a digital still camera 11 in the above description, the present invention is by no means limited thereto and it may alternatively be a personal computer, a personal digital assistance (PDA), a portable telephone set, a video recorder or some other electronic appliance so long as it can communicate with the card-shaped semiconductor memory apparatus 1 by way of the belt-like terminals T of the card-shaped semiconductor memory apparatus 1 for data communications.

While the above-described embodiment of card-shaped semiconductor memory apparatus 1 operates as communication apparatus for communicating with an electronic appliance for data communications and is adapted to store the data received from the electronic appliance (digital still camera 11) in the internal semiconductor memory, the present invention is by no means limited thereto and can be applied to various different communication apparatus including card-shaped communication apparatus for a wireless LAN so long as such apparatus has belt-like terminals T for communicating with an electronic appliance for data communications.

Figure 18:
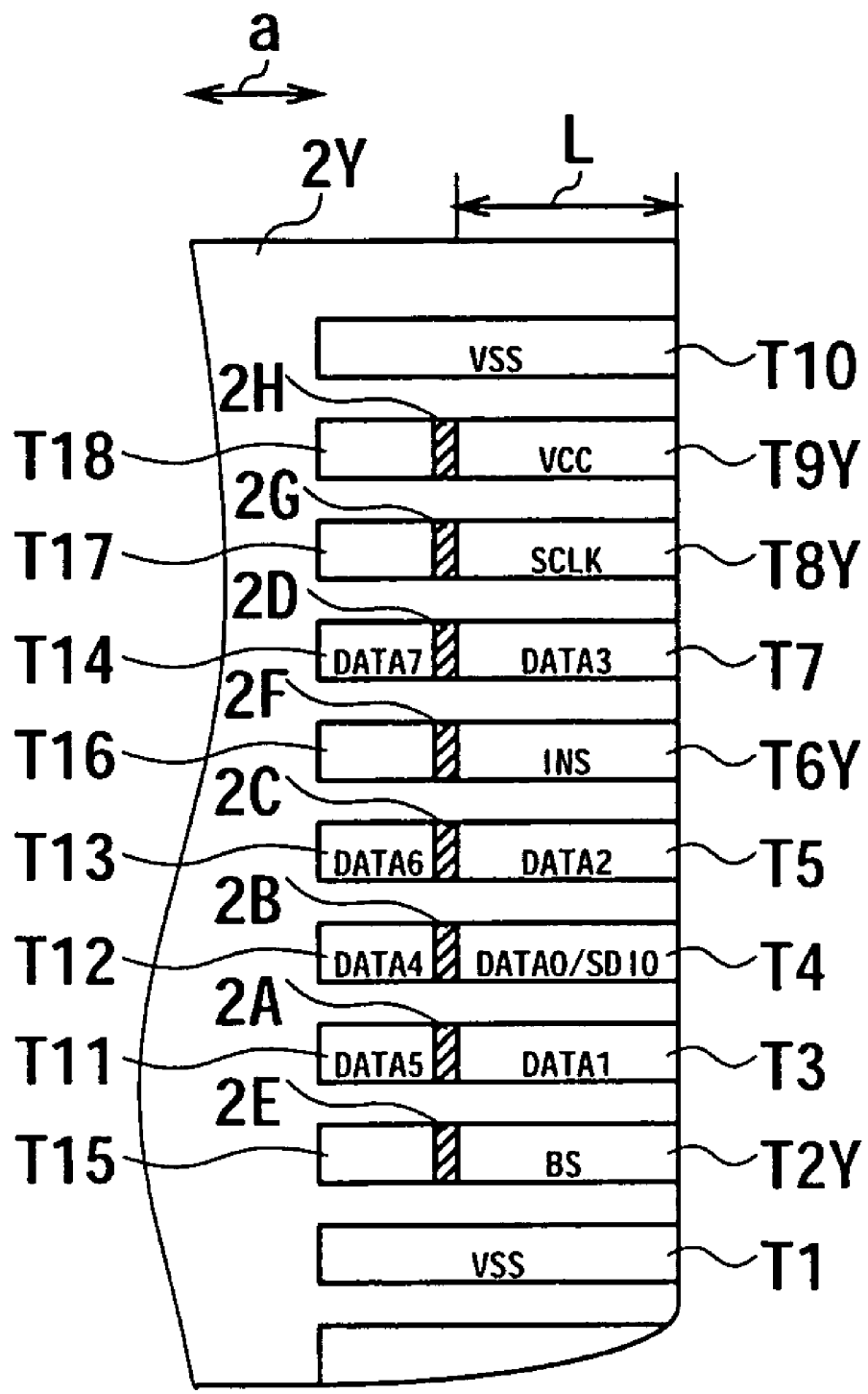
FIG. 18 is a schematic illustration of card-shaped semiconductor memory apparatus according to the another embodiment of the invention, showing its configuration.

While the above-described embodiment of card-shaped semiconductor memory apparatus 1 is provided with additional four belt-like terminals T (T11 through T14) in addition to the existing belt-like terminals T (T1 through T10) arranged at an end of the cabinet as terminals for transmitting data to and receiving data from a digital still camera 11, the present invention is by no means limited thereto and the card-shaped semiconductor memory apparatus 1 may be provided with more belt-like terminals T so long as the existing first through tenth belt-like terminal T (T1 through T10) are connected properly with a digital still camera in related art or the like. For example, fifteenth through eighteenth belt-like terminals T (T15 through T18) may be additionally provided as shown in FIG. 18, in which the components similar to those of FIG. 8 are denoted respectively by the same reference symbols. Additional belt-like terminals T may be arranged not only on the rear surface of the cabinet 2 but also on the front surface of the cabinet 2.

In the embodiment of card-shaped semiconductor memory apparatus illustrated in FIG. 18, a second belt-like terminal T2Y is also extended in the longitudinal direction a of a cabinet 2Y from the short side to a central part of the cabinet 2Y to show a length at least greater than the predetermined length L. A fifteenth belt-like terminal T15 is arranged at the central side of the cabinet 2Y relative to the second belt-like terminal T2Y with an insulating section 2E interposed between them and in array with the second belt-like terminal T2Y. Similarly, the sixth, eighth and ninth belt-like terminals T (T6Y, T8Y and T9Y) are extended in the longitudinal direction a of the cabinet 2Y from the short side to a central part of the cabinet 2Y to show a length at least greater than the predetermined length L. Then, sixteenth, seventeenth and eighteenth belt-like terminals T (T16, T17 and T18) are arranged at the central side of the cabinet 2Y respectively relative to the sixth, eighth and ninth belt-like terminals T (T6Y, T8Y and T9Y) with insulating sections 2F, 2G, 2H interposed between them and in array with the sixth, eighth and ninth belt-like terminals T (T6Y, T8Y and T9Y) respectively.

While the digital still camera 11 and the card-shaped semiconductor memory apparatus 1 are made to communicate with each other for data communications in a 4-bit parallel transfer mode when a positive acknowledgement is obtained in Step SP7 in the above description of the embodiment, the present invention is by no means limited thereto. Alternatively, for instance, the digital still camera 11 and the card-shaped semiconductor memory apparatus 1 may be made to communicate with each other in a serial transfer mode. Similarly, while the digital still camera 11 and the card-shaped semiconductor memory apparatus 1 are made to communicate with each other for data communications in an 8-bit parallel transfer mode when a positive acknowledgement is obtained in Step SP11 in the above description of the embodiment, the present invention is by no means limited thereto and they may alternatively be made to communicate with each other in a serial transfer mode or in a 4-bit parallel transfer mode.

While belt-like terminals T (T3, T4, T5 and T7) are arranged along the short edge of the cabinet as end side data communication terminals and also belt-like terminals T (T11, T12, T13 and T14) are arranged at the central side of the cabinet relative to and in array with the respective end data communication terminals as central side data communication terminals in the above described embodiment, the present invention is by no means limited thereto and terminals having some other profile may be employed as end side data communication terminals and central side data communication terminals.

While a semiconductor memory section 20 according to a flash memory is provided in the above described embodiment as memory for storing the data received from the electronic appliance by way of the group of data communication terminals (belt-like terminals T), the present invention is by no means limited thereto and some other memory device such as a random access memory (RAM) or a hard disk drive may alternatively be used instead of the flash memory so long as it can store the data from the electronic appliance.

While a register section 23 is provided in the above described embodiment as storage section for storing the data (the value of the IF_MODE register) that indicates if data can be exchanged by way of the end data communication terminals and the central data communication terminals, the present invention is by no means limited thereto and the semiconductor memory section 20 or some other memory device may alternatively be used for storing the data.

While the terminal connecting sections P and the interface section 40 of the digital still camera 11 are used as read section for reading the data (the value of the IF_MODE register) stored in the storage section (register section 23) of the communication apparatus (card-shaped semiconductor memory apparatus 1) by way of the end data communication terminals in the above description of the embodiment, the present invention is by no means limited thereto and some other arrangement may alternatively be used for the purpose of the present invention.

While the control section (that corresponds to a central processing unit (CPU) or the like) of the digital still camera is adapted to operate for the sequence RT1 of a data transfer mode selection process as communication section for communicating with the communication apparatus (card-shaped semiconductor memory apparatus 1) by way of both the end data communication terminals and the central data communication terminals for data communications when it is recognized that the communication apparatus can communicate with the digital still camera 11 by way of both the end data communication terminals and the central data communication terminals in the above description of the embodiment, the present invention is by no means limited thereto and some other arrangement may alternatively be used for the purpose of the present invention.

Finally, while the 21st through 29th flip-flop circuits F (F21 through F29) to be connected to the first through fourth connection lines L (L1 through L4) are adapted to operate as first data transmission/reception section for exchanging data with the electronic appliance (digital still camera 11) by way of the end data communication terminals and the 61st through 68th flip-flop circuits F (F61 through F68) to be connected to the eleventh through fourteenth connection lines (L11 through L14) are adapted to operate as second data transmission/reception section for exchange data with the electronic appliance by way of the central data communication terminals in the above described embodiment, the present invention is by no means limited thereto and some other arrangement may alternatively be used for the purpose of the present invention. Additionally, while the 61st through 64th output buffers OB (OB61 through OB64) are adapted to operate as output control section for controlling the second data transmission/reception section so as not to output any data to the electronic appliance when the communication apparatus communicates with the electronic appliance only by way of the end data communication terminals in the above description, the present invention is by no means limited thereto and some other arrangement may alternatively be used for the purpose of the present invention.

The present invention can be applied to semiconductor memory apparatus or the like adapted to be mounted in an electronic appliance and receive data to be transmitted from the electronic appliance and storing them in the internal semiconductor memory.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A communication system including an electronic appliance and a communication apparatus communicating with the electronic appliance for data communications, wherein:
   the communication apparatus includes a group of data communication terminals to be connected with the electronic appliance; and
   the group of data communication terminals includes:
   end data communication terminals arranged at an end of a cabinet of the communication apparatus; and
   central data communication terminals arranged at a central side of the cabinet relative to the end data communication terminals in array with respective end data communication terminals,
   the communication apparatus further includes storage means for storing the data indicating if it can operate for data communications by way of both the end data communication terminals and the central data communication terminals or not; and
   the electronic appliance further includes:
   read means for reading out the data stored in the storage means of the communication apparatus; and
   communication means for communicating with the communication apparatus for data communications by way of both the end data communication terminals and the central data communication terminals when it recognizes that the communication apparatus can operate for data communications by way of both the end data communication terminals and the central data communication terminals on the basis of the data read out by the read means.

2. The system according to claim 1, wherein
   the communication apparatus further includes a memory for storing the data received from the electronic appliance by way of the group of data communication terminals.

3. A communication system including an electronic appliance and a communication apparatus communicating with the electronic appliance for data communications, wherein:
   the communication apparatus includes a group of data communication terminals to be connected with the electronic appliance; and
   the group of data communication terminals includes:
   end data communication terminals arranged at an end of a cabinet of the communication apparatus; and
   central data communication terminals arranged at a central side of the cabinet relative to the end data communication terminals in array with respective end data communication terminals, wherein
   the communication apparatus further includes:
   a first data transmission/reception section for transmitting data to and receiving data from the electronic appliance by way of the end data communication terminals;
   a second data transmission/reception section for transmitting data to and receiving data from the electronic appliance by way of the central data communication terminals; and
   output control means for preventing the second data transmission/reception section from outputting data to the electronic appliance when the communication apparatus is operating for data communications with the electronic appliance only by way of the end data communication terminals.

4. A communication apparatus comprising
   a group of data communication terminals to be connected with an electronic appliance for data communications, wherein
   the group of data communication terminals includes:
   end data communication terminals arranged at an end of a cabinet of the communication apparatus; and
   central data communication terminals arranged at a central side of the cabinet relative to the end data communication terminals in array with respective end data communication terminals, further comprising:
   a first data transmission/reception section for transmitting data to and receiving data from the electronic appliance by way of the end data communication terminals;
   a second data transmission/reception section for transmitting data to and receiving data from the electronic appliance by way of the central data communication terminals; and
   output control means for preventing the second data transmission/reception section from outputting data to the electronic appliance when the communication apparatus is operating for data communications with the electronic appliance only by way of the end data communication terminals.

5. The apparatus according to claim 4, further comprising
   a memory for storing the data received from the electronic appliance by way of the group of data communication terminals.

6. The apparatus according to claim 4, further comprising
storage means for storing the data to be read out by the electronic appliance by way of the end data communication terminals, the data indicating if it can operate for data communications by way of both the end data communication terminals and the central data communication terminals or not.

7. An electronic appliance for communicating with a communication apparatus for data communications by way of a group of data communication terminals including end data communication terminals arranged at an end of a cabinet of the communication apparatus and central data communication terminals arranged at a central side of the cabinet relative to the end data communication terminals in array with respective end data communication terminals, the electronic appliance comprising:

read means for reading out data indicating the feasibility or non-feasibility of data communications by way of both the end data communication terminals and the central data communication terminals stored in the storage means of the communication apparatus from the storage means by way of the end data communication terminals; and communication means for communicating with the communication apparatus for data communications by way of both the end data communication terminals and the central data communication terminals upon recognizing the feasibility of data communications by way of both the end data communication terminals and the central data communication terminals on the basis of the data read out by the read means.

* * * * *